United States Patent
Gutman et al.

(10) Patent No.: US 12,261,728 B2
(45) Date of Patent: Mar. 25, 2025

(54) DMRS WITH DYNAMIC AND CONTROLLABLE PAPR PROPERTIES

(71) Applicant: QUALCOMM Incorporated, San Diego, CA (US)

(72) Inventors: Igor Gutman, Hod HaSharon (IL); Junyi Li, Fairless Hills, PA (US); Tingfang Ji, San Diego, CA (US); Joseph Patrick Burke, Carlsbad, CA (US); Pushkar Bajirao Kulkarni, San Diego, CA (US); Abdelrahman Mohamed Ahmed Mohamed Ibrahim, San Diego, CA (US); Juergen Cezanne, Ocean Township, NJ (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 18/047,559

(22) Filed: Oct. 18, 2022

(65) Prior Publication Data
US 2024/0129172 A1    Apr. 18, 2024

(51) Int. Cl.
*H04L 27/26* (2006.01)
(52) U.S. Cl.
CPC ...... *H04L 27/2613* (2013.01); *H04L 27/2605* (2013.01); *H04L 27/2623* (2013.01)
(58) Field of Classification Search
CPC ............. H04L 27/2613; H04L 27/2605; H04L 27/2623; H04L 2025/03783; H04L 2025/03796; H04L 27/261
See application file for complete search history.

(56) References Cited

U.S. PATENT DOCUMENTS

| | | | |
|---|---|---|---|
| 2018/0324005 A1* | 11/2018 | Kim | H04L 27/2035 |
| 2020/0014569 A1* | 1/2020 | Huang | H04W 8/24 |
| 2020/0106656 A1* | 4/2020 | Nammi | H04W 72/04 |
| 2020/0127801 A1* | 4/2020 | Sengupta | H04L 27/262 |
| 2020/0214083 A1* | 7/2020 | Sengupta | H04L 27/2614 |

(Continued)

OTHER PUBLICATIONS

"Design of DMRS schemes for 5G vehicular communications"; Martin et al.; 2021 IEEE 93rd Vehicular Technology Conference (VTC2021-Spring) | 978-1-7281-8964-2/20/$31.00 © 2021 IEEE | DOI: 10.1109/VTC2021 (Year: 2021).*

*Primary Examiner* — Benjamin H Elliott, IV
(74) *Attorney, Agent, or Firm* — Arent Fox, LLP

(57) ABSTRACT

Aspects are provided for generation and transmission of MDMRS which allow matching of nonlinear model impact or properties between DMRS and data in DFT-s-OFDM waveforms as well as CP-OFDM waveforms. A UE transmits, to a network entity, an MDMRS generated from a DMRS. The MDMRS has a PAPR distribution matching a PAPR distribution of a signal including data in an uplink channel. A target PAPR of the MDMRS is based on a modulation scheme of the data. The UE also transmits the data in the uplink channel, where the uplink channel includes a PUCCH or a PUSCH. As a result of the ability of MDMRS to match the nonlinear impact of DMRS and PUSCH or PUCCH, the network entity may compensate for any EVM that may occur as a result of PAPR reduction by a nonlinear operator of the UE, and communication performance may thereby be improved.

30 Claims, 15 Drawing Sheets

(56) References Cited

U.S. PATENT DOCUMENTS

| | | | | |
|---|---|---|---|---|
| 2020/0228270 | A1* | 7/2020 | Chou | H04L 27/3488 |
| 2020/0266947 | A1* | 8/2020 | Noh | H04L 5/0048 |
| 2021/0083935 | A1* | 3/2021 | Ghosh | H04L 5/0048 |
| 2021/0344535 | A1* | 11/2021 | Sridharan | H04L 27/26362 |
| 2021/0359894 | A1* | 11/2021 | Nammi | H04L 27/262 |
| 2022/0006579 | A1* | 1/2022 | Wang | H04L 27/2634 |
| 2022/0038319 | A1* | 2/2022 | Kuchi | H04L 27/2636 |
| 2022/0078067 | A1* | 3/2022 | Liu | H04L 1/1812 |
| 2022/0085937 | A1* | 3/2022 | Gao | H04L 27/262 |
| 2022/0104254 | A1* | 3/2022 | Matsumura | H04W 74/0808 |
| 2022/0264492 | A1* | 8/2022 | Kim | H04L 27/2607 |
| 2023/0016303 | A1* | 1/2023 | Kutz | H04L 27/2614 |
| 2023/0308333 | A1* | 9/2023 | Zou | H04L 27/2623 |
| 2024/0014922 | A1* | 1/2024 | Liu | H04L 1/0009 |
| 2024/0015057 | A1* | 1/2024 | Patchava | H04L 5/0051 |
| 2024/0129172 | A1* | 4/2024 | Gutman | H04L 27/2605 |

* cited by examiner

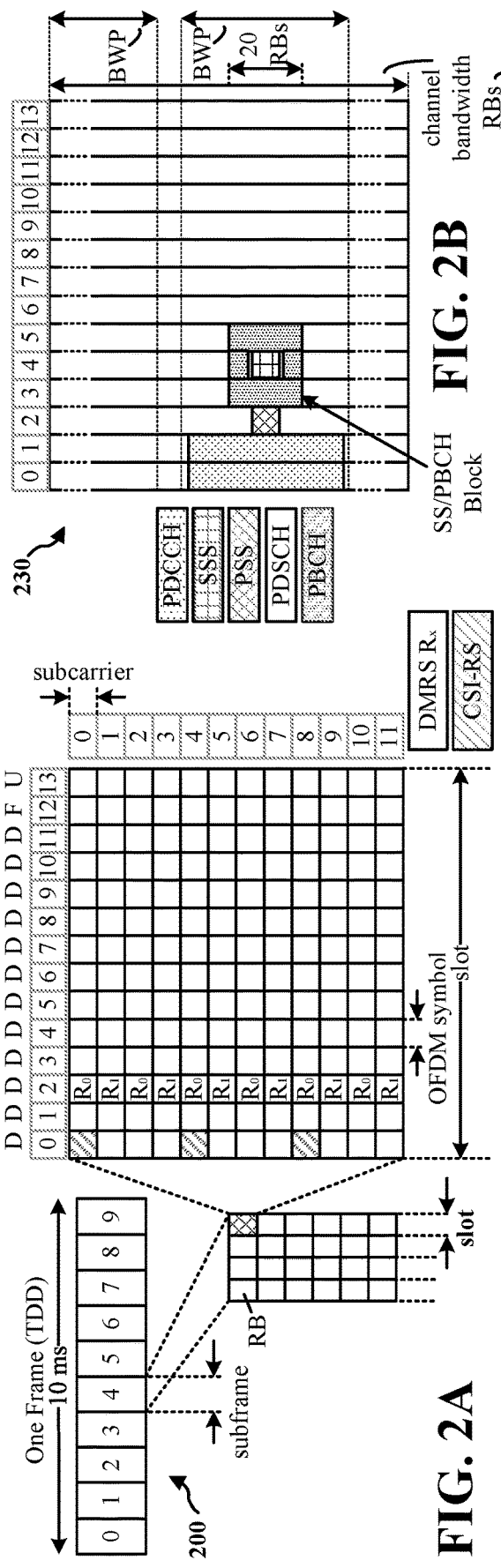
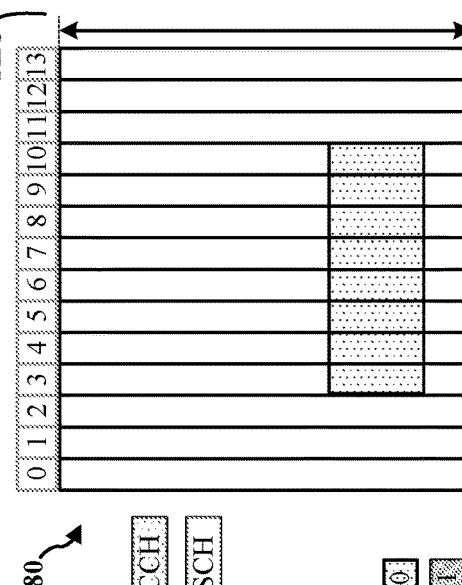
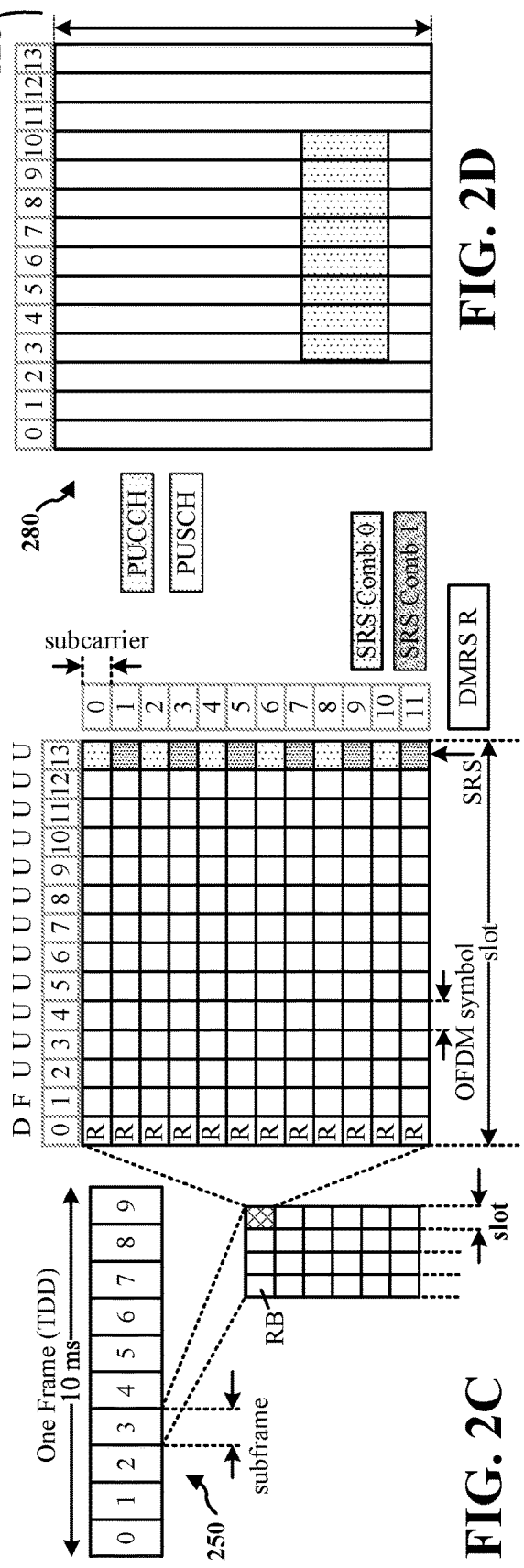
FIG. 2A
FIG. 2B
FIG. 2C
FIG. 2D

1

DMRS WITH DYNAMIC AND CONTROLLABLE PAPR PROPERTIES

BACKGROUND

Technical Field

The present disclosure generally relates to communication systems, and more particularly, to a wireless communication system between a user equipment (UE) and a network entity or device such as a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE includes a processor, memory coupled with the processor, and instructions stored in the memory and operable, when executed by the processor, to cause the apparatus to transmit, to a network entity, a modified demodulation reference signal (MDMRS) generated from a demodulation reference signal (DMRS). The MDMRS has a peak to average power ratio (PAPR) distribution matching a PAPR distribution of a signal including data in an uplink channel, where a target PAPR of the MDMRS is based on a modulation scheme of the data. The instructions, when executed by the processor, further cause the apparatus to transmit the data in the uplink channel, the uplink channel including a physical uplink control channel (PUCCH) or a physical uplink shared channel (PUSCH).

In an aspect of the disclosure, a method, a computer-readable medium, and an apparatus are provided. The apparatus may be a network entity. The network entity includes a processor, memory coupled with the processor, and instructions stored in the memory and operable, when executed by the processor, to cause the apparatus to receive, from a UE, an MDMRS generated from a DMRS. The MDMRS has a PAPR distribution matching a PAPR distribution of a signal including data in an uplink channel, where a target PAPR of the MDMRS is based on a modulation scheme of the data. The instructions, when executed by the processor, further cause the apparatus to receive the data in the uplink channel, the uplink channel including a PUCCH or a PUSCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1A:
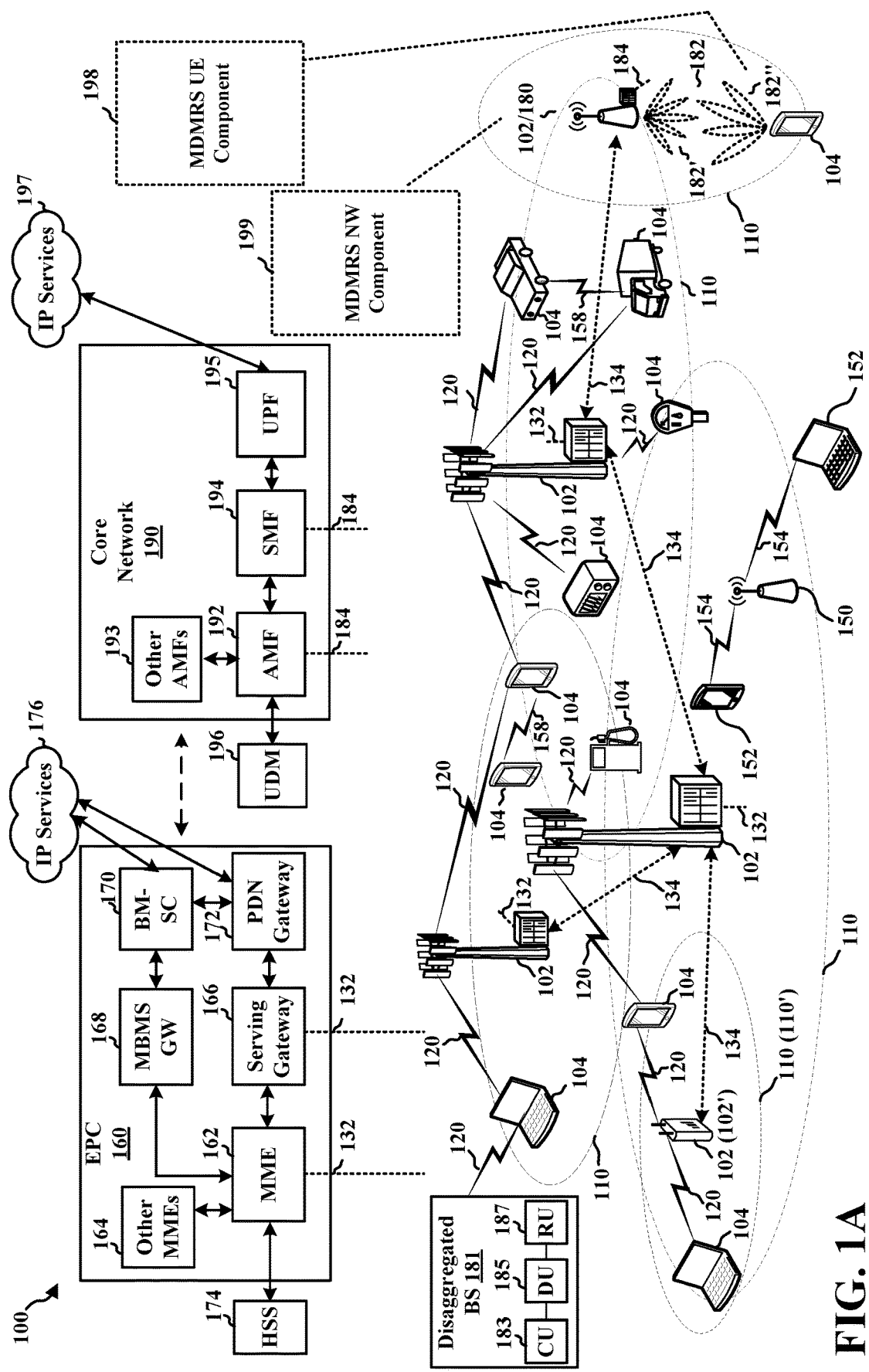
FIG. 1A is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A transmitter of a wireless device such as a UE may include non-linear components or devices, such as high-power amplifiers (PAs). These PAs may include limited linear dynamic range and polynomial response. Thus, if a signal passing through the PA includes a high peak to average power ratio (PAPR), distortion of the transmitted signal may result. In order to avoid those distortions, power output back-off may be applied in which the voltage of the signal input to the PA is reduced to remain within the linear operating range. However, back-off may result in reduced power efficiency, since the less transmission power applied, the more unused power may be dissipated as heat. Moreover, while various methods for reducing PAPR have been applied in attempt to avoid distortions without reduced power efficiency (e.g., iterative clipping and filtering (ICF), coding, tone reservation, tone injection, and the like), such methods have their own costs. For example, tone reservation or injection may require additional bandwidth, ICF may result in performance loss, and coding may increase firmware complexity. Therefore, these techniques for reducing PAPR may also be limited in their efficiency.

Recently, a PAPR reduction approach has been introduced with the aim of improving efficiency over existing PAPR reduction methods. In this approach, a transmitter (e.g., a UE) of an uplink signal may include a nonlinear transmission (NL TX) module implemented in software, firmware, and/or hardware that is configured to compress the signal significantly before the signal is input into the PA. For example, the NL TX module may apply a NL model (e.g., a non-linear operator or formula) that reduces the dynamic range of the signal, resulting in a signal with reduced PAPR and lacking non-linear distortions. However, as this compression may have significant performance cost by impacting the error vector magnitude (EVM) of the signal, the receiver (e.g., a base station) may complementarily include a nonlinear reception (NL RX) module also implemented in software, firmware, and/or hardware that is configured to decompress the received signal with compensation for the impacted EVM. For example, the NL RX module may determine the NL model which the NL TX module applied for the compression, and apply the inverse of the NL model or some other function to reconstruct a significant portion of the compressed signal and recover the performance loss.

The NL RX module may determine the NL model applied by the NL TX module in one of two ways, namely via signaling or via estimation. In the signaling approach, the transmitter indicates the NL model expressly via a message to the receiver, but this approach may result in significant signaling overhead. In the more preferred estimation approach, the receiver estimates the NL model from a demodulation reference signal (DMRS) sent by the transmitter. For instance, to save signaling overhead in uplink communications, the NL RX module of the base station may estimate the NL model used by the NL TX module of the UE to reduce the PAPR of the signal from the DMRSs carried in each slot containing uplink data in PUSCH. The base station may then apply that estimated NL model to decompress the PAPR-reduced uplink data. Since the linear channel estimation is generally performed using DMRS as well, the base station may thus use a single DMRS to estimate both the linear channel between the UE and the base station as well as the NL model used to reduce the PAPR of the uplink data.

However, the success of this approach using such DMRS may depend on the type of waveform in which the uplink data and DMRS are received, since PAs may have a different impact on DMRS and data symbols in cyclic prefix-orthogonal frequency division multiplexing (CP-OFDM) waveforms as opposed to discrete Fourier transform-spread-orthogonal frequency division multiplexing (DFT-s-OFDM) waveforms (or other single carrier-frequency division multiplexing waveforms). For instance, in CP-OFDM waveforms, the PAPR distribution of PUSCH data is the same for all modulation orders due to the central limit theorem, and therefore the PAPR distribution is the same between the DMRS and the data. In contrast, in DFT-s-OFDM waveforms, while the PAPR distribution of the PUSCH data depends on its modulation order (e.g., the higher the modulation order, the higher the PUSCH signal peaks in terms of power), the DMRS sequence which is typically used as a baseline for DMRS generation (e.g., Zadoff Chu) results in the PAPR distribution of the DMRS being the same for all PUSCH modulation orders.

As a result, if the efficient PAPR reduction approach using an NL model as described above were to be applied in a DFT-s-OFDM waveform, then the NL model which the base station (e.g., the NL RX module) would estimate based on a DMRS symbol may not match with the NL model that the UE (e.g., the NL TX module) applied to compress the data symbols. This effect occurs since estimation of the NL model may be affected by the different PAPR distributions between DMRS and PUSCH, unlike estimation of the linear channel between the UE and base station. Therefore, due to the PAPR difference between the DMRS and PUSCH, the NL model which the base station may estimate from the DMRS may not be matched to the NL model that would successfully decode the PUSCH in DFT-s-OFDM waveforms. Thus, since the DMRS may be used not only for linear parameter estimation, but also for estimation of the NL model, it would be helpful to ensure in OFDM waveforms that the PAPR distribution between data (e.g., in PUCCH or PUSCH) and DMRS will be matched.

Accordingly, to make the PAPR distribution the same between DMRS and PUSCH and improve DMRS NL estimation, aspects of the present disclosure allow the transmitter and receiver to generate a PAPR-controlled DMRS, also referred to as a modified DMRS (MDMRS). The MDMRS refers to a DMRS which properties can be controlled, most particularly PAPR, such that the properties between the DMRS and data in PUSCH and/or PUCCH are matched. The generation and transmission of MDMRS may allow matching of NL model impact or properties between DMRS and data in DFT-s-OFDM waveforms as well as CP-OFDM waveforms. In particular, by applying desired PAPR target parameters for a given modulation order of an MDMRS, the transmitter of an uplink communication (e.g., a UE) and the receiver of an uplink communication (e.g., a base station) may determine that the PAPR distributions between data and DMRS match. These desired PAPR target parameters which the UE and base station may apply to generate MDMRS may be either selected by the base station and signaled to the UE, selected by the UE and signaled to the base station, or determined by the UE and base station from pre-defined sets of parameters. As a result, an NL TX module of the UE may apply an NL operator to reduce the PAPR of PUSCH/PUCCH data, while an NL RX module of the base station may estimate from the MDMRS the NL model applied by the NL operator of the UE. Thus, regardless of whether the signal is received in a DFT-s-OFDM waveform or a CP-OFDM waveform, the base station may compensate for any EVM that may occur as a result of the PAPR reduction by the UE, and communication performance may thereby be improved.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1A is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., Si interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G NR systems, may be arranged in multiple manners with various components or constituent parts. In a 5G NR system, or network, a network node, a network entity, a network device, a mobility element of a network, a RAN node, a core network node, a network element, or a network equipment, such as a BS, or one or more units (or one or more components) performing base station functionality, may be implemented in an aggregated or disaggregated architecture. For example, a BS (such as a Node B (NB), eNB, NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station 181 may be configured to utilize a protocol stack that is physically or logically distributed among two or more units (such as one or more central units (CU), one or more distributed units (DUs), or one or more radio units (RUs)). In some aspects, a CU 183 may be implemented within a RAN node, and one or more DUs 185 may be co-located with the CU, or alternatively, may be geographically or virtually distributed throughout one or multiple other RAN nodes. The DUs may be implemented to communicate with one or more RUs 187. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1A, in certain aspects, the UE 104 may include an MDMRS UE component 198 that is configured to transmit, to a network entity, a modified demodulation reference signal (MDMRS) generated from a demodulation reference signal (DMRS), the MDMRS having a peak to average power ratio (PAPR) distribution matching a PAPR distribution of a signal including data in an uplink channel, where a target PAPR of the MDMRS is based on a modulation scheme of the data; and to transmit the data in the uplink channel, the uplink channel including a physical uplink control channel (PUCCH) or a physical uplink shared channel (PUSCH). In certain aspects, the base station 102/180 (or other network device with base station functionality) may include an MDMRS NW component 199 that is configured to receive, from a UE, an MDMRS generated from a DMRS, the MDMRS having a PAPR distribution matching a PAPR distribution of a signal including data in an uplink channel, where a target PAPR of the MDMRS is based on a modulation scheme of the data; and to receive the data in the uplink channel, the uplink channel including a PUCCH or a PUSCH.

Figure 1B:
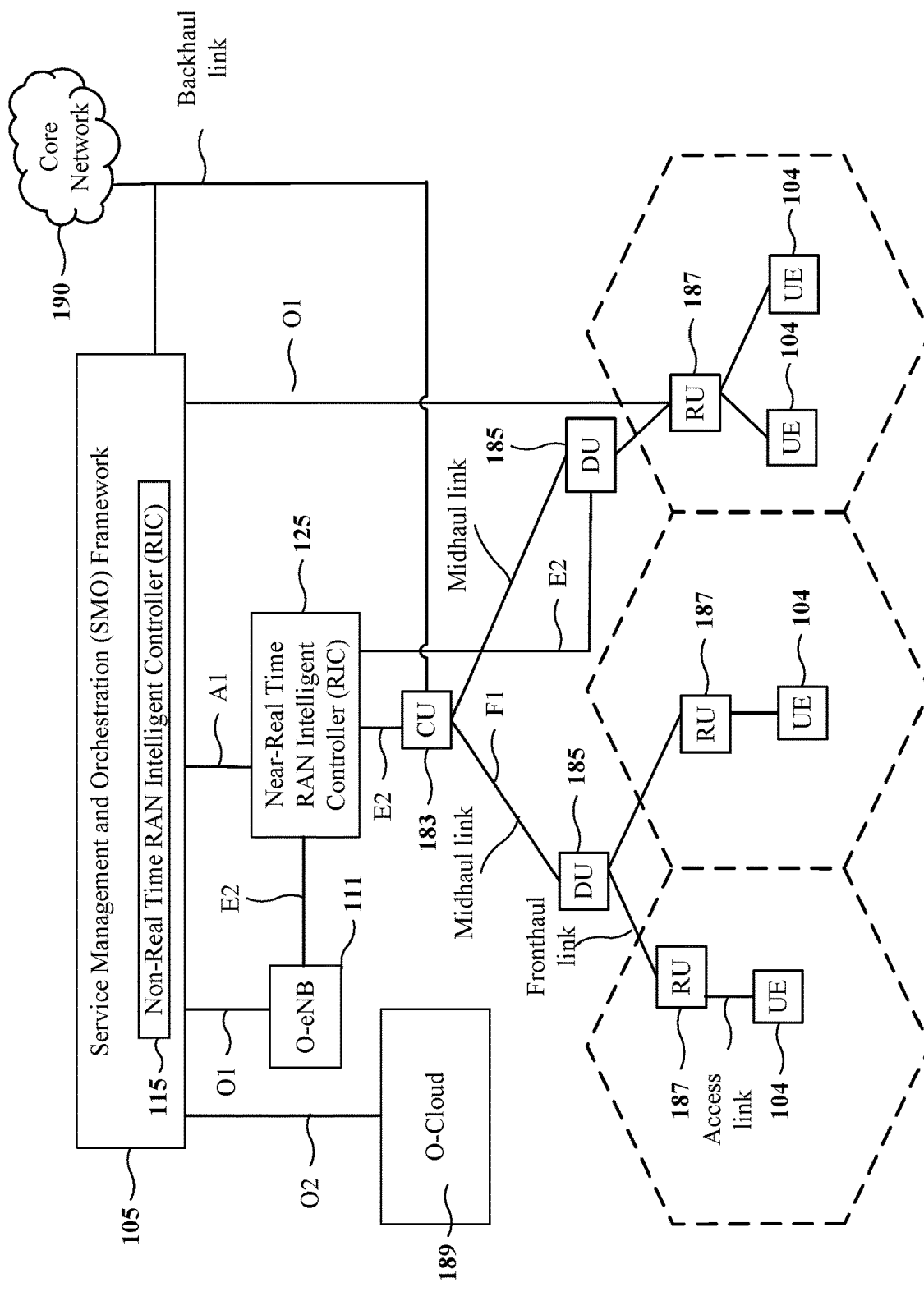
FIG. 1B is a conceptual diagram of an example Open Radio Access Network architecture.

FIG. 1B shows a diagram illustrating an example disaggregated base station 181 architecture. The disaggregated base station 181 architecture may include one or more CUs 183 that can communicate directly with core network 190 via a backhaul link, or indirectly with the core network 190 through one or more disaggregated base station units (such as a Near-Real Time RIC 125 via an E2 link, or a Non-Real Time RIC 115 associated with a Service Management and Orchestration (SMO) Framework 105, or both). A CU 183 may communicate with one or more DUs 185 via respective midhaul links, such as an F1 interface. The DUs 185 may communicate with one or more RUs 187 via respective fronthaul links. The RUs 187 may communicate respectively with UEs 104 via one or more radio frequency (RF) access links. In some implementations, the UE 104 may be simultaneously served by multiple RUs 187.

Each of the units, i.e., the CUs 183, the DUs 185, the RUs 187, as well as the Near-RT RICs 125, the Non-RT RICs 115 and the SMO Framework 105, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 183 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 183. The CU 183 may be configured to handle user plane functionality (i.e., Central Unit-User Plane (CU-UP)), control plane functionality (i.e., Central Unit-Control Plane (CU-CP)), or a combination thereof. In some implementations, the CU 183 can be logically split into one or more CU-UP units and one or more CU-CP units. The CU-UP unit can communicate bidirectionally with the CU-CP unit via an interface, such as the E1 interface when implemented in an O-RAN configuration. The CU 183 can be implemented to communicate with the DU 185, as necessary, for network control and signaling.

The DU 185 may correspond to a logical unit that includes one or more base station functions to control the operation of one or more RUs 187. In some aspects, the DU 185 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 185 may further host one or more low PHY layers. Each layer (or module) can be implemented with an interface configured to communicate signals with other layers (and modules) hosted by the DU 185, or with the control functions hosted by the CU 183.

Lower-layer functionality can be implemented by one or more RUs 187. In some deployments, an RU 187, controlled by a DU 185, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 187 can be implemented to handle over the air (OTA) communication with one or more UEs 104. In some implementations, real-time and non-real-time aspects of control and user plane communication with the RU(s) 187 can be controlled by the corresponding DU 185. In some scenarios, this configuration can enable the DU(s) 185 and the CU 183 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements, which may be managed via an operations and maintenance interface (such as an O1 interface). For virtualized network elements, the SMO Framework 105 may be configured to interact with a cloud computing platform (such as an open cloud (O-Cloud) 189) to perform network element life cycle management (such as to instantiate virtualized network elements) via a cloud computing platform interface (such as an O2 interface). Such virtualized network elements can include, but are not limited to, CUs 183, DUs 185, RUs 187 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 187 via an O1 interface. The SMO Framework 105 also may include the Non-RT RIC 115 configured to support functionality of the SMO Framework 105.

The Non-RT RIC 115 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 183, one or more DUs 185, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2 slots/subframe. The subcarrier spacing and symbol length/duration are a function of the numerology. The subcarrier spacing may be equal to $2^{\mu}*15$ kilohertz (kHz), where p is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
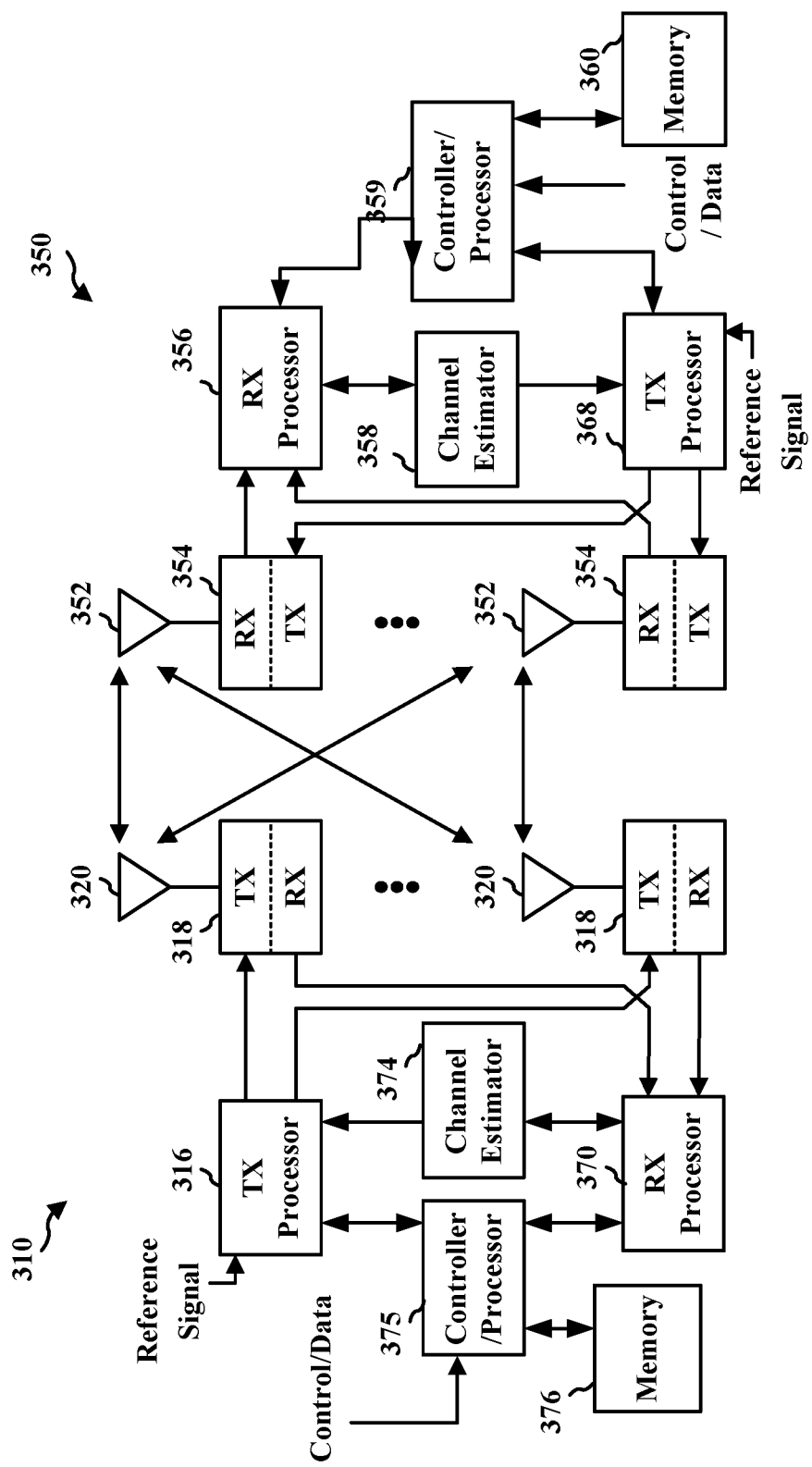
FIG. 3 is a diagram illustrating an example of a base station and user equipment (UE) in an access network.

FIG. 3 is a block diagram of a network device 310 such as a base station in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the network device 310. These soft decisions may be based on channel estimates computed by the channel estimator 358. The soft decisions are then decoded and deinterleaved to recover the data and control signals that were originally transmitted by the network device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the network device 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the network device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the network device 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with MDMRS UE component 198 of FIG. 1A.

At least one of the TX processor 316, the RX processor 370, and the controller/processor 375 may be configured to perform aspects in connection with MDMRS NW component 199 of FIG. 1A.

Transmitter 318TX of UE 104, 350 may include non-linear components or devices, such as high-power amplifiers (PAs). These PAs may include limited linear dynamic range (DR) and polynomial response. Thus, if a signal passing through the PA includes a high peak to average power ratio (PAPR), distortion of the transmitted signal may result. For example, the PA may clip a portion of the signal which exceeds the saturation limit (or linear operating range) of the PA, resulting in non-linear distortions such as in-band distortion and out-band distortion of the signal. In-band distortion may affect link performance in respect to error vector magnitude (EVM), while out-band distortion may dictate an amount of adjacent channel interference.

In order to avoid those distortions, power output back-off may be applied in which the voltage of the signal input to the PA is reduced to remain within the linear operating range. However, back-off may result in reduced power efficiency, since the less transmission power applied, the more unused power may be dissipated as heat. Moreover, the larger the PAPR of the signal, the more power output back-off may be required to avoid exceeding the saturation limit of the PA. As a result, signals with high PAPRs may cause transmission powers to be inefficiently and significantly reduced as a result of power output back-off.

Thus, various methods for reducing PAPR have been applied in attempt to avoid distortions without reduced power efficiency. These methods may include iterative clipping and filtering (ICF), coding, tone reservation, tone injection, and the like. However, such methods have their own costs. For example, tone reservation or injection may require additional bandwidth, ICF may result in performance loss, and coding may increase firmware complexity. Therefore, these techniques for reducing PAPR may also be limited in their efficiency.

Figure 4:
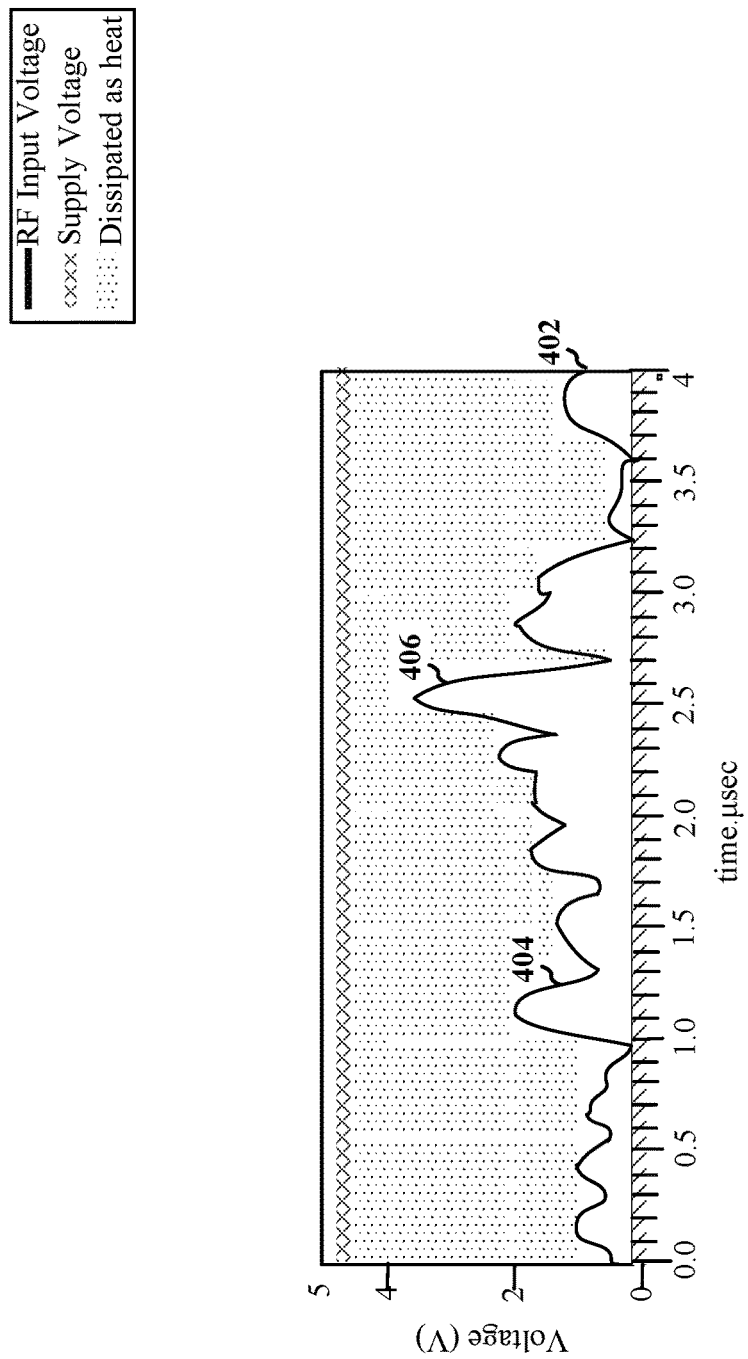
FIG. 4 is a diagram illustrating an example of a voltage distribution of a signal over time which is input into a PA in a transmitter of a UE.

FIG. 4 illustrates an example 400 of a voltage distribution 402 of a signal over time which is input into a PA (e.g., in transmitter 318TX of UE 350). Voltage distribution 402 may have peaks 404 at various instances of time which govern the transmission power of the signal, including a high peak 406 indicative of a high PAPR. If high peak 406 exceeds the saturation limit of the PA, non-linear distortion may result. While the voltage distribution 402 may be reduced via power output back-off in attempt to avoid such non-linear distortion, the reduced power efficiency of the PA that would result may outweigh the benefits of avoiding this distortion. Additionally, existing PAPR reduction methods such as ICF, coding, tone reservation, tone injection, etc. may also be limited in their efficiency.

Recently, a PAPR reduction approach has been introduced with the aim of improving efficiency over existing PAPR reduction methods. In this approach, transmitter 318TX of UE 350 includes a nonlinear transmission (NL TX) module implemented in software, firmware, and/or hardware that is configured to compress the signal significantly before the signal is input into the PA. For example, the NL TX module may apply a NL model (e.g., a non-linear operator or formula) that reduces the dynamic range of the signal, resulting in a signal with reduced PAPR and lacking non-linear distortions. However, as this compression may have significant performance cost by impacting the EVM of the signal, the receiver 354RX of network device 310 may complementarily include a nonlinear reception (NL RX) module also implemented in software, firmware, and/or hardware that is configured to decompress the received signal with compensation for the impacted EVM. For example, the NL RX module may determine the NL model which the NL TX module applied for the compression, and apply the inverse of the NL model or some other function to reconstruct a significant portion of the compressed signal and recover the performance loss.

Figure 5:
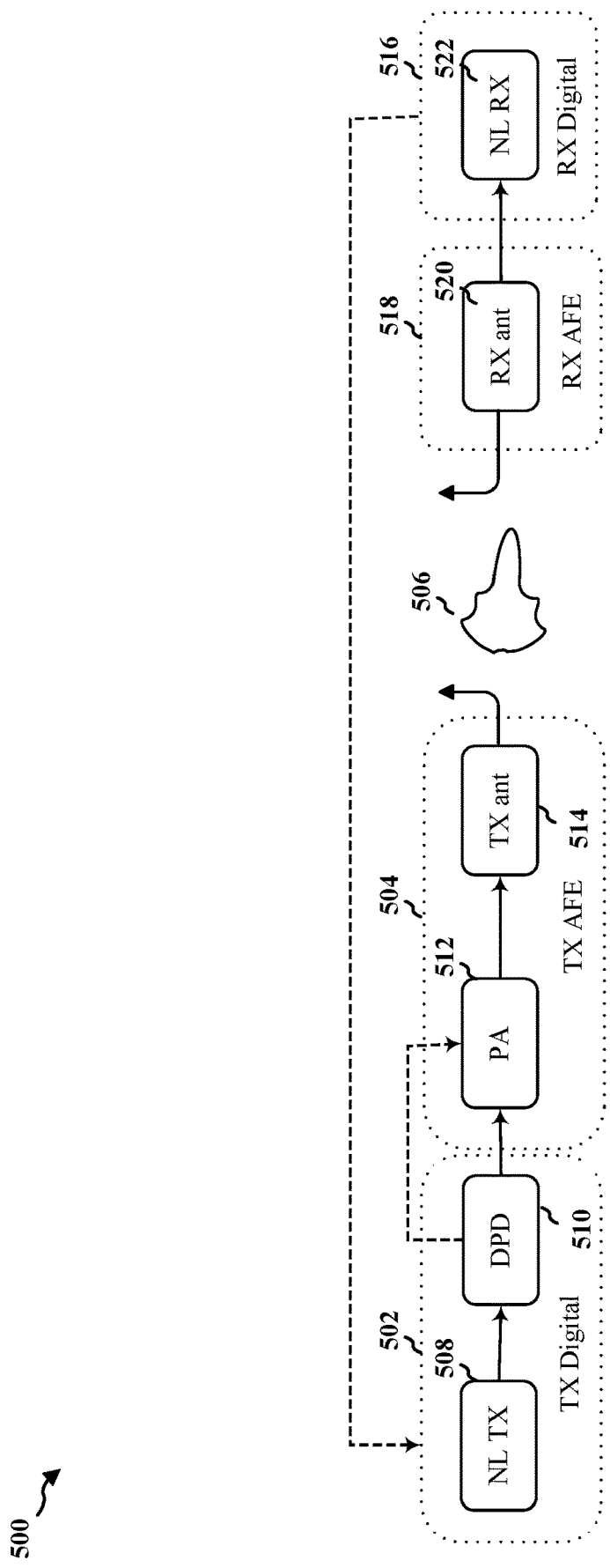
FIG. 5 is a diagram illustrating an example of an end-to-end high level communication system between a transmitter and a receiver incorporating efficient PAPR reduction.

FIG. 5 illustrates an example 500 of an end-to-end high level communication system between a transmitter (e.g., transmitter 318TX) and a receiver (e.g., receiver 354RX) incorporating efficient PAPR reduction. In this example, the transmitter may include a digital TX component 502 for processing a signal in the digital domain and an analog front end (AFE) TX component 504 for processing the signal in the analog domain before the signal is transmitted over a channel 506 to the receiver. In particular, the digital TX component 502 includes a NL TX module 508 which is configured to compress the signal using a NL model following layer 1/2/3 processing (e.g., in response to receiving the signal from TX processor 316), and a digital pre-distortion (DPD) block 510 which is configured to perform DPD on the compressed signal prior to passing the signal to the PA. The AFE TX component 504 includes a PA 512 which amplifies the compressed and digitally pre-distorted signal, and one or more TX antennas 514 (e.g., antennas 320) through which the power amplified signal is transmitted over channel 506 to the receiver. The receiver may similarly include a digital RX component 516 and an AFE RX component 518 for respectively processing a signal in the digital domain and analog domain after the signal is received over the channel 506 from the transmitter. The AFE RX component 518 includes one or more RX antennas 520 (e.g., antennas 352) through which the signal is received over channel 506 from the transmitter, and the digital RX component 516 includes a NL RX module 522 which is configured to determine the NL model applied by the NL TX module 508, decompress the signal and compensate for any impacted EVM prior to layer 1/2/3 processing (e.g., prior to passing the signal to RX processor 356). As a result, transmission of a signal with reduced PAPR and without non-linear distortions may be achieved.

The NL RX module 522 may determine the NL model applied by the NL TX module 508 in one of two ways, namely via signaling or via estimation. In the signaling approach, the transmitter indicates the NL model expressly via a message to the receiver, but this approach may result in significant signaling overhead. In the more preferred estimation approach, the receiver estimates the NL model from a demodulation reference signal (DMRS) sent by the transmitter. For instance, to save signaling overhead in uplink communications, the NL RX module 522 of the base station may estimate the NL model used by the NL TX module 508 of the UE to reduce the PAPR of the signal from the DMRSs carried in each slot containing uplink data in PUSCH. The base station may then apply that estimated NL model to decompress the PAPR-reduced uplink data. Since the linear channel estimation is generally performed using DMRS as well, the base station may thus use a single DMRS to estimate both the linear channel between the UE and the base station as well as the NL model used to reduce the PAPR of the uplink data.

Figure 6:
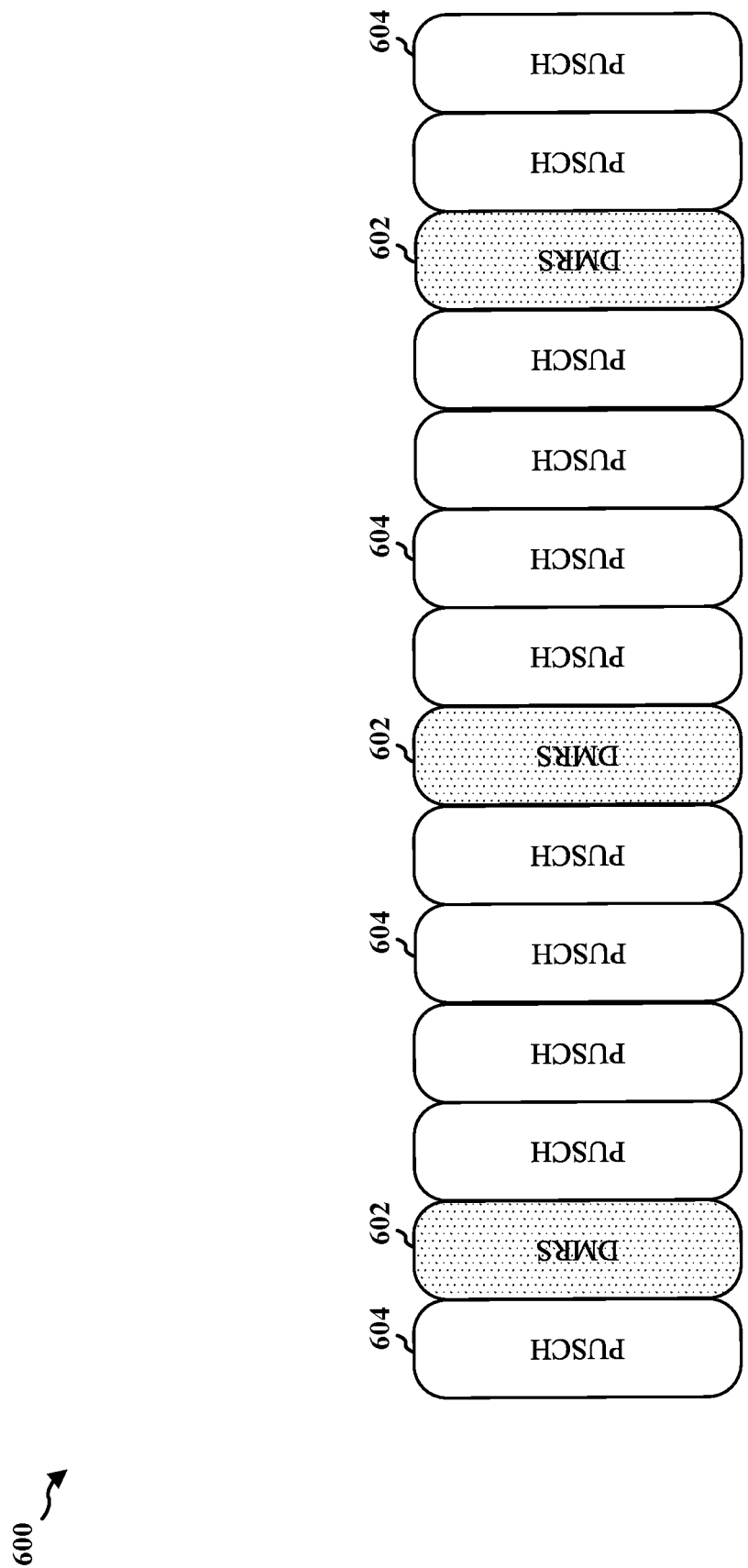
FIG. 6 is a diagram illustrating an example of a slot including uplink resources containing DMRSs and PUSCH data.

FIG. 6 illustrates an example 600 of a slot including uplink resources containing DMRSs 602 and PUSCH data 604. To demodulate the PUSCH data 604, the base station may perform linear channel estimation using the DMRSs 602. However, if the UE applies power output-backoff to its PA to avoid non-linear distortion of the DMRS and PUSCH, this PA impact may influence reception performance of DMRS and PUSCH at the base station. For example, if power output-backoff was applied to the PUSCH symbols, the base station would observe a smaller signal to noise and interference ratio (SINR) in PUSCH data 604, reducing performance of its demodulation process. Similarly, if power output-backoff was applied to the DMRS symbols, the base station would observe a smaller SINR in DMRSs 602, which not only would impact demodulation performance of the DMRSs but also reduce channel estimation performance. Moreover, at high modulation orders (e.g., 256QAM), the backoff may be significant, further resulting in reduced power efficiency. Furthermore, other PAPR reduction techniques such as ICF, tone reservation, tone injection, etc. may result in smaller SINR and thus similar impact to demodulation and channel estimation performance.

Therefore, to address the influence that PAs may have on both DMRS and data symbols, the UE and base station may apply the aforementioned, efficient PAPR approach using the NL model as described above. For instance, the NL TX module 508 of the UE may compress the PUSCH data 604 using the NL model, and the NL RX module 522 of the base station may estimate the NL model used by the UE from the DMRS 602 and apply that NL model to decompress the PUSCH data 604. However, the success of this approach using such DMRS may depend on the type of waveform in which the uplink data and DMRS are received, since PAs may have a different impact on DMRS and data symbols in cyclic prefix-orthogonal frequency division multiplexing (CP-OFDM) waveforms as opposed to discrete Fourier transform-spread-orthogonal frequency division multiplexing (DFT-s-OFDM) waveforms (or other single carrier-frequency division multiplexing waveforms).

Figure 7A:
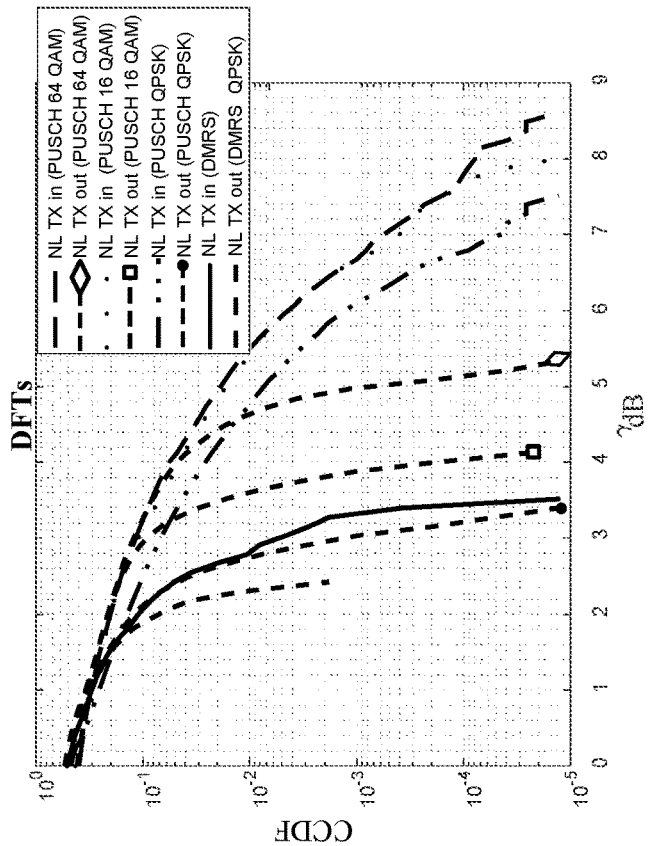
FIGS. 7A-7B are diagrams illustrating examples of PAPR distributions for signals of different modulation orders in CP-OFDM and DFT-s-OFDM waveforms, respectively.
Figure 7B:
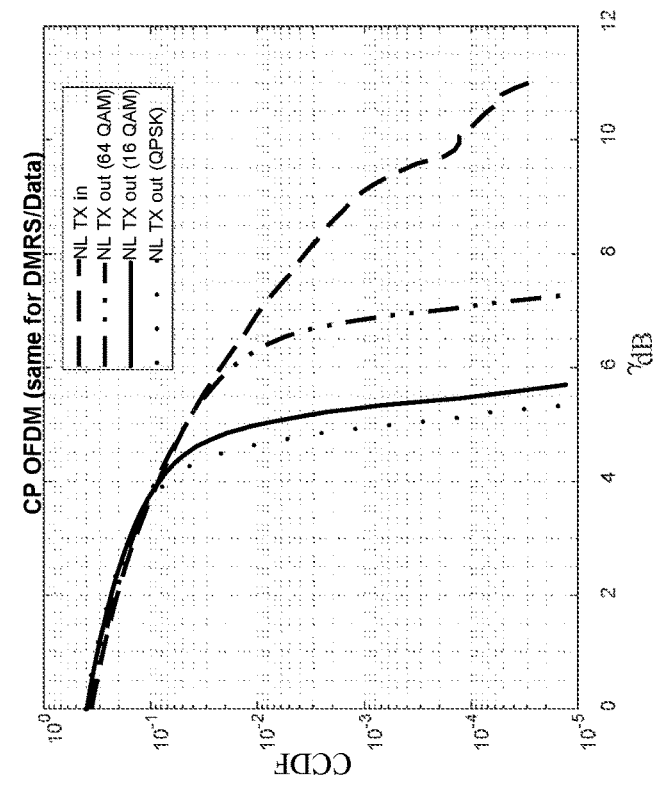

FIGS. 7A-7B illustrate examples 700, 750 of PAPR distributions for signals of different modulation orders in CP-OFDM and DFT-s-OFDM waveforms, respectively. In CP-OFDM waveforms, the PAPR distribution of PUSCH data is the same for all modulation orders due to the central limit theorem, and therefore the PAPR distribution is the same between the DMRS and the data. For example, although DMRS is generally modulated with only a QPSK scheme while uplink data may be modulated with any other scheme (e.g., 64QAM/128QAM/256QAM), both the DMRS and data may still have the same PAPR distributions irrespective of the PUSCH modulation order (e.g., the peaks of a PUSCH data signal may be statistically the same as those of a DMRS regardless of PUSCH modulation order). Thus, FIG. 7A illustrates the matching PAPR distributions of DMRS and PUSCH data signals at the input and the output of the NL TX module 508 of FIG. 5 including different PUSCH modulation orders. For instance, as shown in the example of FIG. 7A, the PAPR distribution of a QPSK-modulated DMRS may be the same as the PAPR distribution of a QPSK-modulated PUSCH, a 16QAM-modulated PUSCH, or a 64QAM-modulated PUSCH.

In contrast, in DFT-s-OFDM waveforms, while the PAPR distribution of the PUSCH data depends on its modulation order (e.g., the higher the modulation order, the higher the PUSCH signal peaks in terms of power), the DMRS sequence which is typically used as a baseline for DMRS generation (e.g., Zadoff Chu) results in the PAPR distribution of the DMRS being the same for all PUSCH modulation orders. As a result, since a Zadoff Chu sequence is designed for the DMRS to have low PAPR, a QPSK-modulated DMRS would maintain the same PAPR distribution notwithstanding the PUSCH modulation order, and thus the DMRS would have a different PAPR distribution than that of PUSCH data signals having higher modulation orders (e.g., 64QAM/128QAM/256QAM). Thus, FIG. 7B illustrates the un-matching PAPR distributions of DMRS and PUSCH data signals at the input and output of the NL TX module 508 of FIG. 5 including different PUSCH modulation orders. For instance, as shown in the example of FIG. 7B, the PAPR distribution of a QPSK-modulated DMRS may be different than the PAPR distribution of a 16QAM-modulated PUSCH or a 64QAM-modulated PUSCH.

As a result, if the efficient PAPR reduction approach using an NL model as described above were to be applied in a DFT-s-OFDM waveform, then the NL model which the base station (e.g., the NL RX module 522) would estimate based on a DMRS symbol may not match with the NL model that the UE (e.g., the NL TX module 508) applied to compress the data symbols. This effect occurs since estimation of the NL model may be affected by the different PAPR distributions between DMRS and PUSCH, unlike estimation of the linear channel between the UE and base station. For instance, if the base station merely applies a linear receiver, then the different PAPR distributions between DMRS and PUSCH in DFT-s-OFDM waveforms may not matter, as the receiver may simply estimate the linear channel using the DMRS and demodulate the PUSCH based on the channel estimation. But if the base station also applies a non-linear receiver, such as the NL RX module 522 of FIG. 5 which estimates the NL model that the NL TX module 508 of the UE used to aggressively reduce PAPR of the PUSCH data signal (in order to remove the EVM resulting from the compression), then the receiver's estimation accuracy of the NL model may be affected by the difference in PAPR distributions. For example, if the NL RX module 522 uses DMRS 602 to estimate the NL model for PAPR reduction, but the QPSK-modulated DMRS with its low-power peaks is below the PA saturation limit while the higher modulation order PUSCH data 604 with higher-power peaks is distorted/clipped above this limit, the estimation of the model from the DMRS 602 may be inaccurate for decompressing/decoding the PUSCH data 604.

Therefore, even though this estimation inaccuracy may not be present in CP-OFDM waveforms, where a difference in PAPR distribution between DMRS and PUSCH does not exist (e.g., even after peak clipping/distortion), this estimation inaccuracy may still exist in DFT-s-OFDM waveforms, since nonlinear model estimation requires DMRS and PUSCH to have the same PAPR distribution. As a result, due to the PAPR difference between the DMRS and PUSCH, the NL model which the base station may estimate from the DMRS may not be matched to the NL model that would successfully decode the PUSCH in DFT-s-OFDM waveforms. Thus, since the DMRS may be used not only for linear parameter estimation, but also for estimation of the NL model, it would be helpful to ensure in OFDM waveforms that the PAPR distribution between data (e.g., in PUCCH or PUSCH) and DMRS will be matched. In CP-OFDM waveforms, this match between PAPR distributions may occur as a result of the central limit theorem, while in DFT-s-OFDM waveforms, this match may occur if the DMRS has the same allocation and same modulation as the data. However, since potential noise enhancement may impact the feasibility of having a DMRS with the same allocation and modulation as PUSCH data, it would be helpful to provide another way to match the PAPR distributions between the DMRS and the data.

Accordingly, to make the PAPR distribution the same between DMRS and PUSCH and improve DMRS NL estimation, aspects of the present disclosure allow the transmitter and receiver to generate a PAPR-controlled DMRS, also referred to as a modified DMRS (MDMRS). The MDMRS refers to a DMRS which properties can be controlled, most particularly PAPR, such that the properties between the DMRS and data in PUSCH and/or PUCCH are matched. In various examples, MDMRS may be generated in one of two methods. In one example method, the MDMRS may simply be predefined (e.g., while the transmitter is offline) and stored in memory for later use. For example, the modulation symbols of the MDMRS may be stored in memory and these MDMRS modulation symbols may be subsequently obtained when the UE is ready to modulate DMRS for an uplink transmission. In another example method, the MDMRS may be generated on the fly (e.g., while the transmitter is online and processing communications in real time) using an NL operator which may be configured in both the transmitter and the receiver. For example, the UE or transmitter may apply a NL operator on the DMRS, such as shown and described below with respect to FIG. 8, using various parameters to obtain the MDMRS with a target PAPR for transmission to the base station. The base station or receiver may similarly apply the NL operator on the DMRS using the same parameters to construct the MDMRS and then apply this MDMRS for channel estimation. In either example method, the MDMRS (e.g., its various modulation symbols) may result in a controlled, target/output PAPR such that the PAPR distribution of the MDMRS matches the PAPR distribution of the PUSCH/PUCCH data. The generation of MDMRS may also maintain the properties of the DMRS from which the MDMRS was derived, with the exception of EVM in the transmitted signal such as illustrated in the "QPSK-like" modulation scheme shown in the constellation diagram of FIG. 9. Nevertheless, this EVM may not impact communication performance since the MDMRS is generated using the same parameters at both the transmitter and the receiver.

Figure 8:
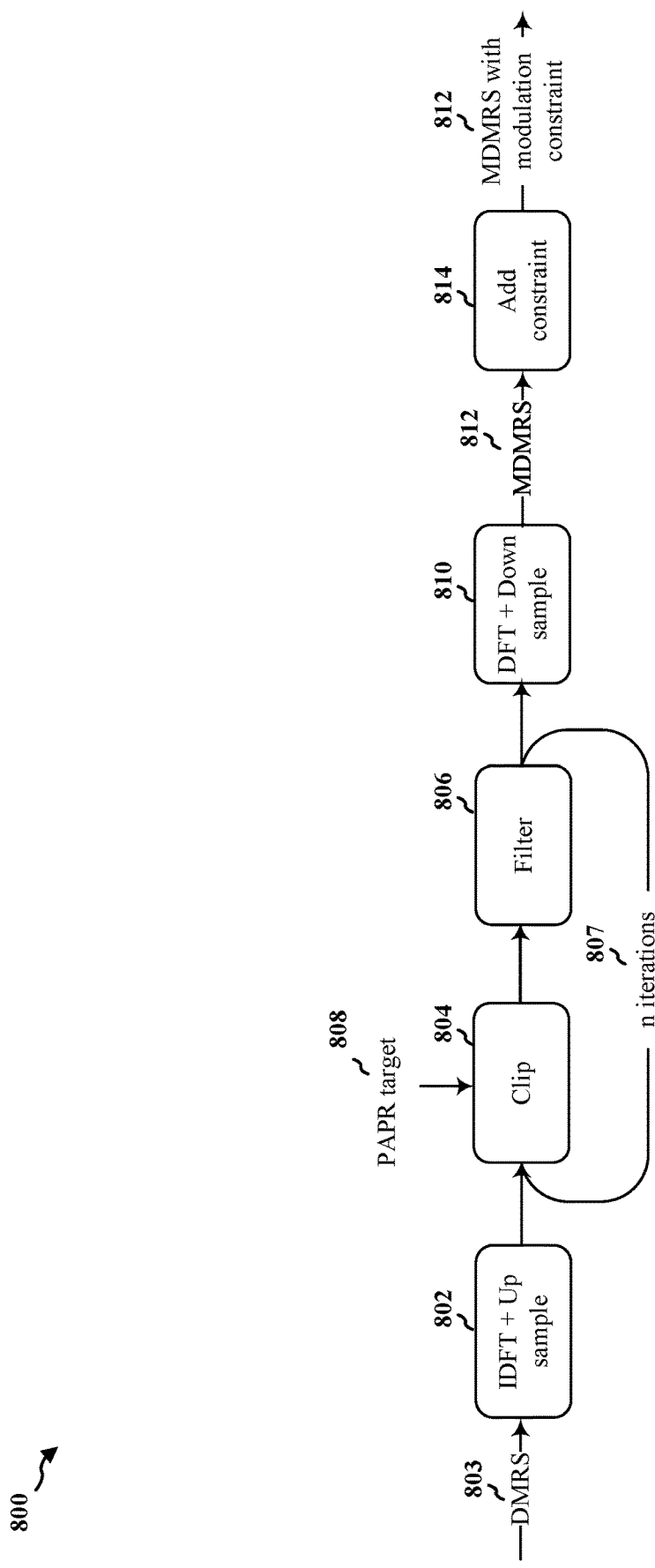
FIG. 8 is a diagram illustrating an example of a process which a nonlinear operator in a transmitter and a receiver may respectively apply to generate an MDMRS from a standard, QPSK-modulated DMRS.

FIG. 8 illustrates an example 800 of a process which an NL operator in the transmitter and receiver (e.g., the NL TX module 508 and NL RX module 522 of FIG. 5 respectively) may respectively apply to generate an MDMRS from a standard, QPSK-modulated DMRS. While FIG. 8 illustrates a specific process the NL operator applies for generating an MDMRS, it should be understood that the NL operator may generate an MDMRS in other manners. Initially, at block 802 and following QPSK modulation, layer mapping, and other layer 1 processes applied to a DMRS 803, the NL operator applies an inverse discrete Fourier transform (IDFT) on the DMRS 803 which converts the DMRS 803 into the time domain. The NL operator also performs up-sampling on the time domain representation of the DMRS 803. After up-sampling, at block 804, the NL operator performs clipping of the signal in the time domain, and at block 806, the NL operator performs filtering of the clipped signal using a pre-defined filter. The NL operator performs this clipping and filtering in a number of iterations 807 (e.g., three iterations) until a target PAPR 808 of the signal has been reached. For example, if the DMRS 803 originally has a maximum PAPR of 3 dB, the DMRS 803 may have a target, maximum PAPR of 5 dB, 6 dB, 10 dB, or other PAPR following the clipping and filtering. Afterwards, at block 810, the NL operator down-samples the signal and performs a discrete Fourier transform (DFT) to convert the signal back into the frequency domain. The resulting signal is MDMRS 812, which has the QPSK modulation symbols of the DMRS 803 in addition to other meaningless modulation symbols, such as illustrated in the constellation diagram of FIG. 9.

Additionally, at block 814, the NL operator may constrain the energy of the MDMRS. This step is to prevent the MDMRS from having zero-value, or approximately zero-value, modulation symbols (e.g., symbols whose in-phase and quadrature coordinates may be close to the origin of the constellation diagram of the MDMRS in FIG. 9), as such modulation symbols may impact linear channel estimation. In this step, the NL operator may modify the modulation symbols whose energy is less than a constraint threshold (e.g., a threshold between and including 2 and 5 dB) by changing their values such that their in-phase and quadrature coordinates are closer to those of a standard QPSK modulation symbol (e.g., modulation symbols 1+j, 1−j, −1+j, −1−j). In other words, the NL operator may move the coordinates of these low-energy modulation symbols (the zero-value or approximately zero-value modulation symbols) towards any of the four corners shown in the constellation diagram of the MDMRS in FIG. 9. This movement may result in an empty circular region centered around the origin of the constellation diagram such as illustrated in FIG. 9, which radius is controlled by the value of the constraint threshold.

Figure 9:
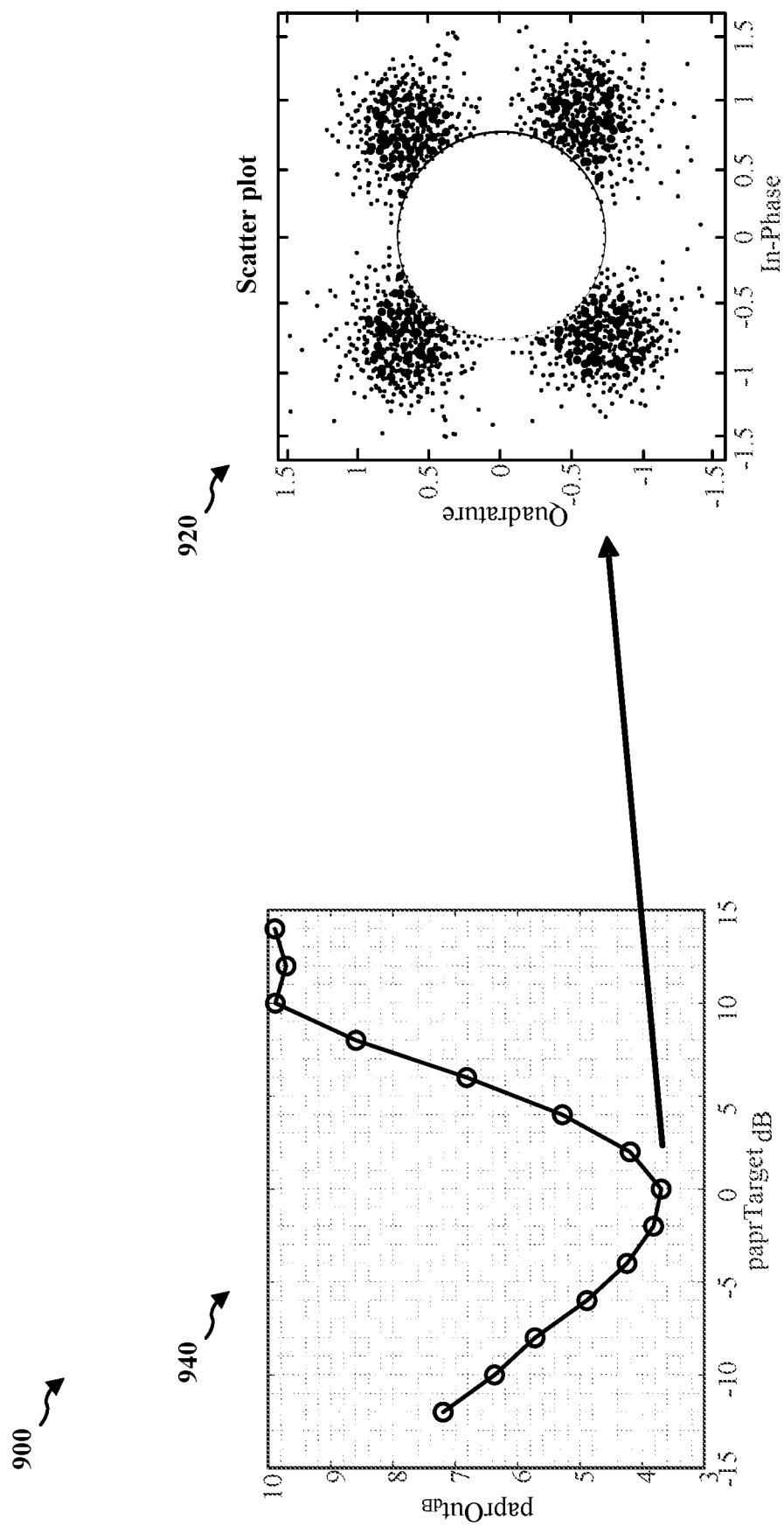
FIG. 9 is a diagram illustrating an example of a constellation diagram of an MDMRS.

FIG. 9 illustrates an example 900 of a constellation diagram 920 of an MDMRS. The MDMRS may have the same properties as the DMRS from which the MDMRS is generated. For example, the constellation diagram 920 may include the four, standard QPSK modulation symbols of DMRS (e.g., modulation symbols 1+j, 1−j, −1+j, −1−j). However, the transmitter may cause EVM to be introduced as a result of generating the MDMRS. For example, the MDMRS may also include numerous other meaningless modulation symbols (i.e., garbage modulation symbols), such as illustrated in the constellation diagram 920 of FIG. 9. Nevertheless, since the MDMRS generated at the receiver side from DMRS matches the transmitted MDMRS, this EVM may not affect communication performance. As a result, the receiver may disregard this EVM when it performs NL model estimation using the MDMRS.

The transmitter or receiver may generate an MDMRS having any desirable PAPR, such as the different target PAPRs illustrated in chart 940. This PAPR-controlled property of MDMRS allows the transmitter and receiver to match PAPR distributions between DMRS and uplink data. The transmitter and receiver may generate MDMRS having any of these target PAPRs in real-time using the NL operator of FIG. 8, or after obtaining previously stored MDMRS modulation symbols in memory. In one example, the transmitter and receiver may generate MDMRS in connection with the NL operator for PAPR reduction of FIG. 5. For example, the receiver may use MDMRS to estimate an NL model which the transmitter applies to reduce the PAPR of its signal. In another example, the transmitter or receiver may generate MDMRS having any of these target PAPRs without using the NL operator of FIG. 5 (e.g., for a different purpose than improving estimation of an NL model for PAPR reduction). For instance, the MDMRS may be generated to match PAPR distributions between DMRS and data for coverage enhancement purposes.

Thus, referring back to FIG. 8, the NL operator may control the target PAPR of the DMRS such that the PAPR between MDMRS and PUSCH are the same for both CP-OFDM and DFT-s-OFDM waveforms. However, while setting the target PAPR to be exactly the same for MDMRS as for PUSCH may cause the maximum PAPRs to be matched, the signal distributions themselves may not be matched in CP-OFDM waveforms in contrast to DFT-s-OFDM waveforms. For instance, the signal distributions (e.g., the amplitude distribution values) may still be different between MDMRS and PUSCH in CP-OFDM waveforms, even though in DFT-s-OFDM waveforms the signal distributions may be the same between MDMRS and PUSCH. This difference between amplitude distribution values of MDMRS in CP-OFDM and DFT-s-OFDM waveforms, referred to throughout this disclosure as a "distribution delta", may be used to offset the target PAPR to better match the MDMRS and PUSCH signal distributions in CP-OFDM waveforms. For instance, before the NL operator of FIG. 8 performs clipping and filtering of the up-sampled DMRS to match a target PAPR of the PUSCH, the NL operator may first subtract the target PAPR by the distribution delta to obtain a more accurate PAPR target for the MDMRS. For example, if the distribution delta is 0.5 or 1 dB and the target PAPR is 6 dB for PUSCH, the NL operator may subtract the distribution delta from the target PAPR to result in a DMRS target PAPR of 5 dB or 5.5 dB, and the NL operator may perform clipping and filtering of this DMRS target PAPR over the configured number of iterations before completing the MDMRS generation process of FIG. 8 as previously described.

Figure 10:
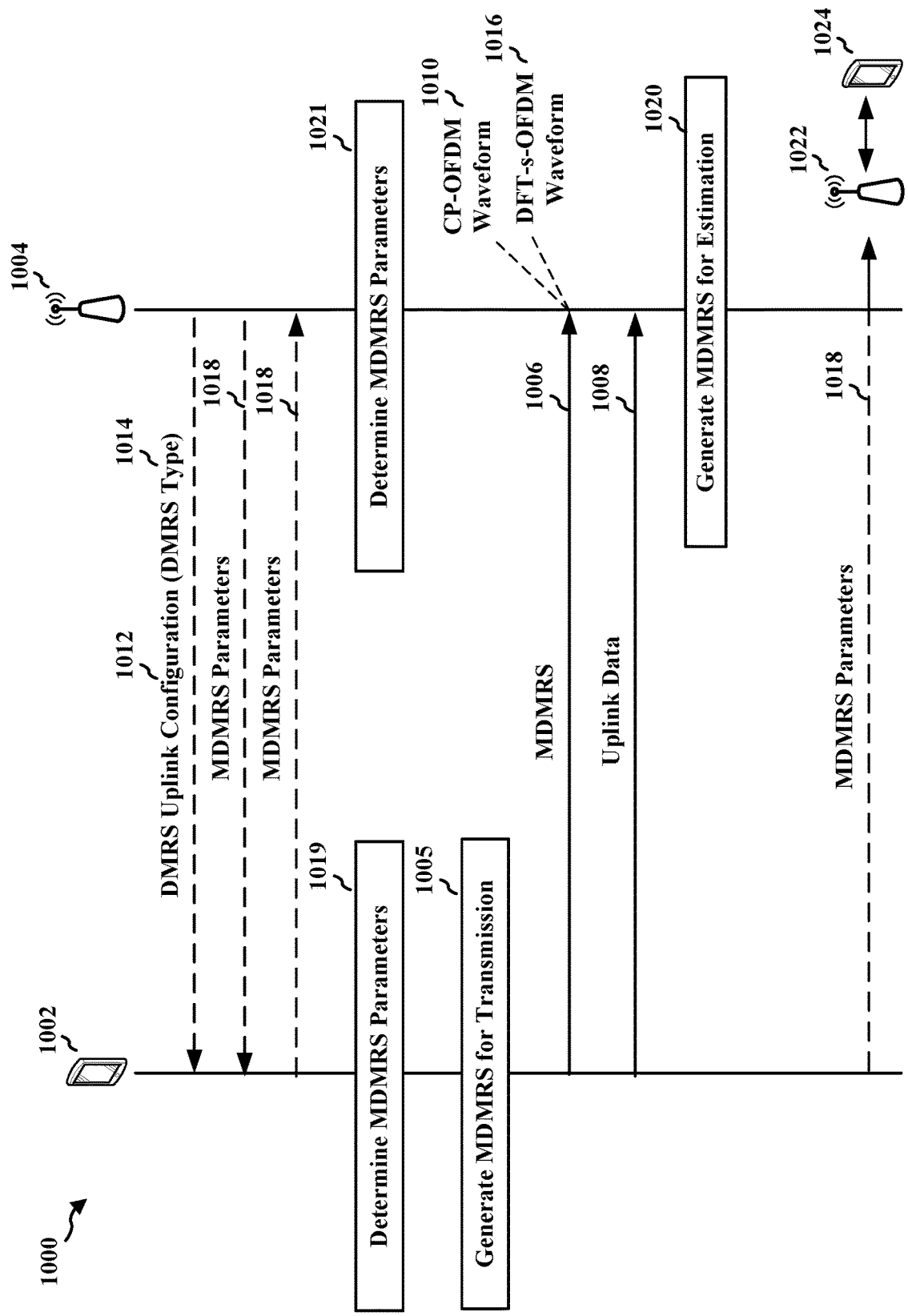
FIG. 10 is a call flow diagram between a UE and a network entity such as a base station.

FIG. 10 illustrates an example 1000 of a call flow diagram between a UE 1002 and a base station 1004. The diagram illustrates example signaling that may occur between the UE 1002 and the base station 1004 in accordance with the various aspects of this disclosure. For instance, FIG. 10 illustrates example aspects of parameter signaling for MDMRS generation and example aspects of MDMRS transmission between the UE 1002 and the base station 1004.

In a first example, the DMRS transmission may be in CP-QPSK symbols, however with a controlled PAPR (i.e., an MDMRS transmission) that matches the PAPR distribution observed on the uplink data (e.g., PUSCH or PUCCH). For instance, following generation of an MDMRS at block 1005 (e.g., such as described with respect to FIG. 8), the UE 1002 may transmit MDMRS 1006, having a target PAPR that is controlled to match that of uplink data 1008 (e.g., in a PUSCH or PUCCH), in QPSK-modulated symbols in a CP-OFDM waveform 1010. For example, referring to FIG. 8, the NL operator of the UE 1002 may receive a target PAPR (e.g., 5 dB, 6 dB, 10 dB, or whatever PAPR value that matches the current PUSCH modulation scheme), and the NL operator may convert a QPSK-modulated DMRS (e.g., with a 3 dB PAPR) to an MDMRS whose PAPR matches this target PAPR. This MDMRS would end up having modulation symbols as illustrated in the constellation diagram of FIG. 9. The UE 1002 may subsequently transmit this MDMRS in QPSK-modulated symbols in a CP-OFDM waveform to base station 1004, and the NL operator of the base station 1004 in turn may similarly convert the QPSK-modulated DMRS to an MDMRS with matching PAPR for estimation purposes.

When generating MDMRS, the target PAPR of the MDMRS may be configured to match the PAPR of a current PUSCH (or PUCCH) modulation scheme. For instance, since PAPR is generally a function of modulation scheme (e.g., QPSK, 16QAM, 64QAM, and 256QAM all are associated with different PAPR distributions), a different DMRS or pilot (MDMRS) may be generated for each modulation scheme. Accordingly, the NL operator of FIG. 8 may apply different parameters, depending on the modulation order, to generate different MDMRS which PAPR distributions respectively match the PAPR distributions of the corresponding PUSCH modulation scheme. The UE 1002 or base station 1004 may generate different MDMRS for different PUSCH modulation schemes regardless of the OFDM waveform applied (i.e., not only in DFT-s-OFDM waveforms but also in CF-OFDM waveforms).

Furthermore, the UE 1002 and base station 1004 may generate MDMRS for each layer independently. For example, when the UE 1002 performs layer mapping of modulated symbols, the UE may generate different MDMRS to be mapped to respective, individual layers. Thus, the NL operator of FIG. 8 may result in one generated MDMRS per layer. Additionally, the MDMRS generation may be based on the specific DMRS type configured for that MDMRS. For instance, as illustrated in FIG. 10, prior to generation of an MDMRS from a DMRS at block 1005, the base station 1004 may transmit to UE 1002 a DMRS uplink configuration 1012 indicating a DMRS type 1014 for the DMRS, where the DMRS type may be either configuration type 1 or configuration type 2, and the UE may generate the MDMRS if the DMRS type is specifically configuration type 1 in one example. Alternatively, the UE may generate the MDMRS if the DMRS type is configuration type 2 in another example, or the UE may apply different parameters for MDMRS generation depending on whether the DMRS type is configuration type 1 or configuration type 2. Here, configuration type 1 and configuration type 2 refer to different patterns of resource element allocation for DMRS. For instance, in configuration type 1, every second resource element may be used within symbols allocated for DMRS, while in configuration type 2, every third resource element may be used within symbols allocated for DMRS.

In a second example, the DMRS transmission may be in DFT-s modulated symbols having the same modulation and crest factor reduction (CFR) properties as those of PUSCH or PUCCH. For instance, following generation of an MDMRS at block 1005 (e.g., such as described with respect to FIG. 8), the UE 1002 may transmit MDMRS 1006 such as described previously in the first example, but instead of transmitting in QPSK-modulated symbols in CP-OFDM waveform 1010, here the UE transmits MDMRS 1006 in a DFT-s-OFDM waveform 1016 using a same modulation scheme as that applied for the uplink data 1008 (e.g., QPSK, 16QAM, 64QAM, or 256QAM). That is, unlike the first example where the MDMRS is transmitted in QPSK-modulated symbols irrespective of the modulation scheme of the uplink data 1008, here the MDMRS may be transmitted in QPSK, 16QAM, 64QAM, or 256QAM-modulated symbols respectively depending on and matching the modulation scheme applied for the PUSCH or PUCCH. The MDMRS 1006 here may also include not only the same CFR properties (e.g., matching PAPR distributions) as the corresponding PUSCH or PUCCH, but also the same signal or voltage distribution (e.g., amplitude distribution value) as that of the PUSCH or PUCCH (unlike in the first example where the MDMRS has an approximation of the same signal or voltage distribution as that of the PUSCH or PUCCH).

When the UE 1002 generates MDMRS 1006 at block 1005 having a matching PAPR distribution with that of uplink data 1008 (PUSCH or PUCCH), the MDMRS may be derived based on various parameters or target properties. These properties used to match the PAPR distributions (e.g., the parameters which the NL operator of FIG. 8 may apply to generate the MDMRS) may be determined at the UE 1002 and base station 1004 in one of multiple manners. In one example, the base station 1004 may determine the desired or target properties for MDMRS, signal these properties or parameters to the UE 1002, and the UE may implement these parameters (e.g., in its NL operator of FIG. 8) to obtain the MDMRS 1006. For instance, in this example, base station 1004 may signal parameters 1018 to UE 1002 via a MAC-CE or an RRC message for the UE to apply at block 1005 in its MDMRS generation. In another example, the UE 1002 may determine the target properties for MDMRS including PAPR, and signal these properties or parameters to the base station 1004. For instance, in this example, UE 1002 may signal parameters 1018 via an MAC-CE or an RRC message to base station 1004 to apply at block 1020 when the base station generates MDMRS for estimation purposes. In a further example, these properties or parameters may be pre-configured and dependent upon the OFDM waveform used for the uplink data 1008 (e.g., CP-OFDM or DFT-s-OFDM) and the modulation scheme applied to the uplink data 1008 (e.g., QPSK, 16QAM, 64QAM, or 256QAM). For instance, in this example, at block 1019 and 1021, the UE 1002 and base station 1004 may respectively determine the parameters 1018 from a pre-defined set of parameters depending on the modulation scheme and OFDM waveform applied for uplink data 1008, where different parameters in this pre-defined set may be respectively applied for different modulation schemes or OFDM waveforms. UE 1002 and base station 1004 may then apply these pre-configured parameters when generating MDMRS at block 1005 or block 1020, respectively.

In any of the foregoing examples, the parameters 1018 may include any of the following: one or more low pass filter (LPF) coefficients (e.g., for filtering the up-sampled DMRS at block 806 of FIG. 8), a number of iterations (e.g., for clipping and filtering the up-sampled DMRS at blocks 804 and 806 of FIG. 8), a PAPR target (e.g., the target PAPR 808 which may obtained for the DMRS following the number of iterations of clipping and filtering at blocks 804 and 806 of FIG. 8), up-sampling and down-sampling factors (e.g., for up-sampling and down-sampling the time domain representation of the DMRS following performance of an IDFT at block 802 and prior to performance of a DFT at block 810 of FIG. 8, respectively), a constraint threshold (e.g., for constraining the energy of the MDMRS 812 at block 814 of FIG. 8), and a distribution delta (e.g., for matching the signal distributions between MDMRS signals in CP-OFDM and DFT-s-OFDM waveforms, which the NL operator may use to offset the target PAPR 808 prior to performing clipping and filtering at blocks 804 and 806 of FIG. 8). Moreover, in any of the foregoing examples, each modulation order or modulation scheme may have a different set of parameters 1018 (e.g., QPSK may be associated with one set of values for the aforementioned parameter(s), 16QAM may be associated with another set of values for the aforementioned parameter(s), etc.). Thus, the base station 1004 may signal these different parameters to the UE 1002 for each modulation scheme (in multiple sets of parameters 1018), the UE 1002 may signal these different parameters to the base station 1004 for each modulation scheme (in multiple sets of parameters 1018), or the UE 1002 and base station 1004 may determine these different parameters from a pre-defined set of parameters for each modulation scheme (from multiple sets of parameters 1018).

Regardless of how the MDMRS properties are delivered or determined (e.g., via downlink signaling, uplink signaling, or pre-definition of parameters 1018), the UE 1002 and base station 1004 may both select to apply these properties for a given modulation when transmitting or receiving MDMRS 1006 respectively. For example, at block 1005, the UE 1002 may input the DMRS using a given modulation scheme into the NL operator of FIG. 8 to generate an MDMRS 812 using the parameters 1018 associated with that modulation scheme, and the UE 1002 may subsequently transmit the MDMRS 1006 to the base station 1004. In another example, the base station 1004 may receive DMRS using the given modulation scheme, the base station 1004 may similarly generate MDMRS 812 at block 1020 using the NL operator of FIG. 8 based on the parameters 1018 associated with that modulation scheme, and the base station 1004 may subsequently perform channel estimation on the MDMRS 1006. In the foregoing examples, the UE 1002 or base station 1004 may generate the MDMRS in real-time in their respective baseband units using firmware or software configured to perform the functions of the NL operator of FIG. 8. In other examples, the UE 1002 or base station 1004 may pre-generate the MDMRS 1006 and store its modulation symbols in memory while the devices are offline, and the UE or base station 1004 may access these modulation symbols from memory for wireless communication when the devices are back online.

Additionally, after determining the parameters 1018 for MDMRS 1006, the base station 1004 (or even the UE 1002) may signal these MDMRS properties to a neighbor cell for estimating uplink inter-cell interference. For instance, in the example of FIG. 10, base station 1004 may communicate with UE 1002 in one cell while a second base station 1022 may communicate with a second UE 1024 in another cell. In such scenario, it is possible that when UE 1002 sends MDMRS 1006 to base station 1004 in a transmission beam, a sidelobe transmission of this MDMRS from UE 1002 may cause interference at second base station 1022, preventing successful communication between second base station 1022 with second UE 1024. Therefore, regardless of how the MDMRS properties are delivered (e.g., via downlink signaling, uplink signaling, or pre-definition of parameters 1018), base station 1004 or UE 1002 in this example may signal the parameters 1018 to second base station 1022 (e.g. via backhaul link of base station 1004) so that second base station 1022 may estimate and reduce the interference from UE 1002 and thus improve reception of communications from second UE 1024. For example, second base station 1022 may apply on its data symbols the interference measured on the MDMRS symbols (e.g., by whitening) when operating in an interference limited system.

Figure 11:
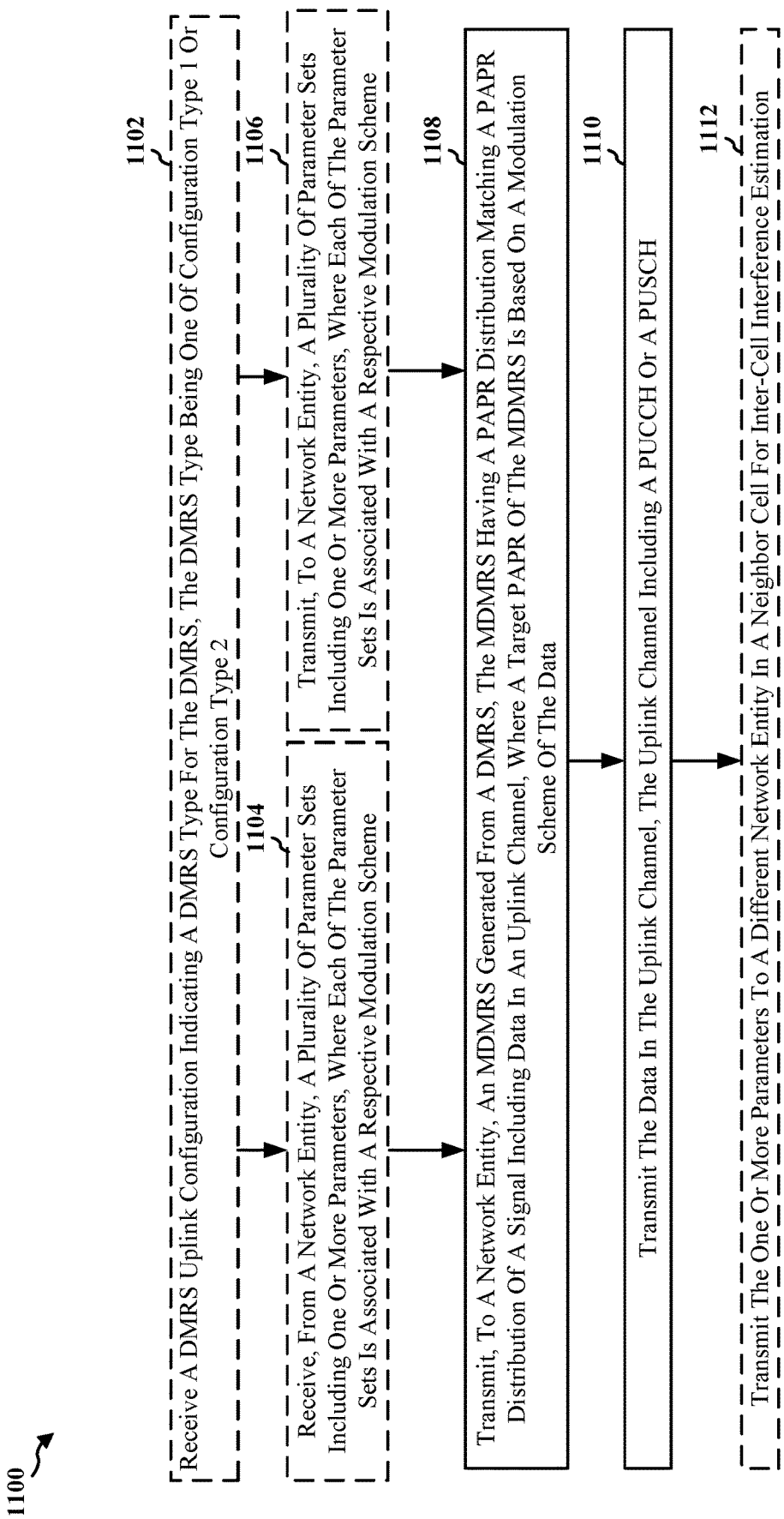
FIG. 11 is a flowchart of a method of wireless communication at a UE.

FIG. 11 is a flowchart 1100 of a method of wireless communication. The method may be performed by a UE (e.g., the UE 104, 350, 1002; the apparatus 1302). Optional aspects are illustrated in dashed lines. The method allows a UE to generate and transmit MDMRS using defined target parameters that result in matching PAPR distributions between DMRS and uplink data (e.g., in PUCCH or PUSCH).

At 1102, the UE may receive a DMRS uplink configuration indicating a DMRS type for a DMRS. For example, 1102 may be performed by DMRS uplink configuration component 1344. For instance, referring to FIG. 10, UE 1002 may receive DMRS uplink configuration 1012 indicating DMRS type 1014 for DMRS 602, 803. The DMRS type may be one of configuration type 1 or configuration type 2.

At 1104, the UE may receive, from a network entity, a plurality of parameter sets including one or more parameters, where each of the parameter sets is associated with a respective modulation scheme. For example, 1104 may be performed by parameter set component 1346. For instance, referring to FIG. 10, base station 1004 may determine the target properties for MDMRS and signal these properties or parameters 1018 to the UE 1002. In such case, UE 1002 may receive from base station 1004 multiple sets of parameters 1018 respectively for different modulation schemes (e.g., QPSK, 16QAM, 64QAM, 256QAM, etc.) via a MAC-CE or an RRC message.

Alternatively, at 1106, the UE may transmit, to the network entity, a plurality of parameter sets including the one or more parameters, where each of the parameter sets is associated with a respective modulation scheme. For example, 1106 may be performed by parameter set component 1346. For instance, referring to FIG. 10, UE 1002 may determine the target properties for MDMRS and signal these properties or parameters 1018 to the base station 1004. In such case, UE 1002 may transmit to base station 1004 multiple sets of parameters 1018 respectively for different modulation schemes (e.g., QPSK, 16QAM, 64QAM, 256QAM, etc.) via a MAC-CE or an RRC message.

As an alternative to 1104 and 1106, the one or more parameters may be preconfigured in one of a plurality of predefined parameter sets, and each of the predefined parameter sets may be associated with a respective modulation scheme and an orthogonal frequency division multiplexing (OFDM) waveform. For instance, referring to FIG. 10, UE 1002 and base station 1004 may respectively determine at blocks 1019 and 1021 the target properties for MDMRS from pre-configured or pre-defined sets of parameters 1018, which sets of parameters are dependent upon the OFDM waveform used for the uplink data 1008 (e.g., CP-OFDM or DFT-s-OFDM) and the modulation scheme applied to the uplink data 1008 (e.g., QPSK, 16QAM, 64QAM, or 256QAM).

In one example, the one or more parameters may include: a low pass filter coefficient (LPF) for filtering the DMRS, a number of iterations for clipping and filtering the DMRS, the target PAPR for the DMRS, an up-sampling factor for the DMRS, a down-sampling factor for the DMRS, a constraint threshold for constraining energy of the MDMRS, or a difference between an amplitude distribution value of the MDMRS in a cyclic prefix-orthogonal frequency division multiplexing (CP-OFDM) waveform and in a discrete Fourier transform-spread-orthogonal frequency division multiplexing (DFT-s-OFDM) waveform. For instance, referring to FIG. 10, the parameters 1018 may correspondingly include any of the following: one or more LPF coefficients (e.g., for filtering the up-sampled DMRS at block 806 of FIG. 8), a number of iterations (e.g., for clipping and filtering the up-sampled DMRS at blocks 804 and 806 of FIG. 8), a PAPR target (e.g., the target PAPR 808 which may obtained for the DMRS following the number of iterations of clipping and filtering at blocks 804 and 806 of FIG. 8), up-sampling and down-sampling factors (e.g., for up-sampling and down-sampling the time domain representation of the DMRS following performance of an IDFT at block 802 and prior to performance of a DFT at block 810 of FIG. 8, respectively), a constraint threshold (e.g., for constraining the energy of the MDMRS 812 at block 814 of FIG. 8), and a distribution delta (e.g., for matching the signal distributions between MDMRS signals in CP-OFDM and DFT-s-OFDM waveforms, which the NL operator may use to offset the target PAPR 808 prior to performing clipping and filtering at blocks 804 and 806 of FIG. 8).

At 1108, the UE transmits, to a network entity, a MDMRS generated from the DMRS, the MDMRS having a PAPR distribution matching a PAPR distribution of a signal including data in an uplink channel, where a target PAPR of the MDMRS is based on a modulation scheme of the data. For example, 1108 may be performed by MDMRS transmission component 1340. For instance, referring to FIG. 10, following generation of MDMRS 812, 1006 from DMRS 602, 803 at block 1005 (e.g., using the NL operator of FIG. 8), UE 1002 may transmit MDMRS 812, 1006 to base station 1004. For example, referring to FIG. 8, the NL operator of the UE 1002 may receive a target PAPR (e.g., 5 dB, 6 dB, 10 dB, or whatever PAPR value that matches the current PUSCH modulation scheme), and the NL operator may convert a QPSK-modulated DMRS (e.g., with a 3 dB PAPR) to an MDMRS whose PAPR matches this target PAPR.

In one example, the MDMRS is generated prior to transmission based on the one or more parameters associated with the modulation scheme of the data. For instance, referring to FIG. 10, when the UE 1002 generates MDMRS 812, 1006 at block 1005 having a matching PAPR distribution with that of uplink data 1008 (PUSCH or PUCCH), the MDMRS 812, 1006 may be derived based on various parameters 1018 or target properties (e.g., the parameters which the NL operator of FIG. 8 may apply to generate the MDMRS). The UE 1002 may select to apply these properties for a given modulation when transmitting MDMRS 1006. For example, at block 1005, the UE 1002 may input the DMRS 602, 803 using a given modulation scheme into the NL operator of FIG. 8 to generate an MDMRS 812, 1006 using the parameters 1018 associated with that modulation scheme, and the UE 1002 may subsequently transmit the MDMRS 812, 1006 to the base station 1004.

In one example, the DMRS includes a quadrature phase shift keying (QPSK) modulation scheme, and the MDMRS is transmitted in a cyclic prefix-orthogonal frequency division multiplexing (CP-OFDM) waveform. For instance, referring to FIG. 10, the DMRS 602, 803 from which the MDMRS 812, 1006 is generated at block 1005 may be QPSK-modulated, and the UE 1002 may transmit the MDMRS 812, 1006 in CP-OFDM waveform 1010.

In one example, the data is transmitted in a plurality of layers, and the MDMRS is generated respectively for each of the layers. For instance, referring to FIG. 10, when the UE 1002 performs layer mapping of modulated symbols, the UE may generate different MDMRS to be mapped to respective, individual layers. Thus, the NL operator of FIG. 8 may result in one generated MDMRS per layer. Accordingly, if uplink data 1008 is transmitted in multiple layers, the UE 1002 may generate and transmit MDMRS 812, 1006 for each of these multiple layers.

In one example, the MDMRS is generated based on the DMRS type at 1102 being the configuration type 1 or the configuration type 2. For instance, referring to FIG. 10, the UE 1002 may generate the MDMRS 812, 1006 at block 1005 if the DMRS type 1014 is specifically configuration type 1 in one example. Alternatively, the UE 1002 may generate the MDMRS 812, 1006 if the DMRS type 1014 is configuration type 2 in another example. Alternatively, the UE 1002 may apply different parameters (e.g., different values of parameters 1018) for MDMRS generation depending on whether the DMRS type 1014 is configuration type 1 or configuration type 2.

In one example, the DMRS includes a same modulation scheme as the modulation scheme of the data, and the MDMRS is transmitted in a discrete Fourier transform-spread-orthogonal frequency division multiplexing (DFT-s-OFDM) waveform. For instance, following generation of an MDMRS at block 1005 (e.g., such as described with respect to FIG. 8), the UE 1002 may transmit MDMRS 812, 1006 in DFT-s-OFDM waveform 1016 using a same modulation scheme as that applied for the uplink data 1008 (e.g., QPSK, 16QAM, 64QAM, or 256QAM).

At 1110, the UE transmits the data in the uplink channel, the uplink channel including a PUCCH or a PUSCH. For example, 1110 may be performed by uplink data transmission component 1342. For instance, referring to FIG. 10, UE 1002 may transmit to base station 1004 uplink data 1008 including a PUCCH or PUSCH (e.g., PUSCH data 604).

At 1112, the UE may transmit the one or more parameters to a different network entity in a neighbor cell for inter-cell interference estimation. For example, 1112 may be performed by neighbor cell component 1348. For instance, referring to FIG. 10, it is possible that when UE 1002 sends MDMRS 812, 1006 to base station 1004 in a transmission beam, a sidelobe transmission of this MDMRS from UE 1002 may cause interference at second base station 1022 in a neighbor cell. Therefore, UE 1002 may signal the parameters 1018 to second base station 1022 (e.g. via backhaul link of base station 1004) so that second base station 1022 may estimate and reduce the interference from UE 1002.

In one example, the MDMRS includes modulation symbols previously stored in the memory or generated in real-time. For instance, referring to FIG. 10, the UE 1002 may generate the MDMRS 812, 1006 at block 1005 in real-time in its cellular baseband unit using firmware or software configured to perform the functions of the NL operator of FIG. 8. In other examples, the UE 1002 may pre-generate the MDMRS 1006 and store its modulation symbols in memory while the device is offline, and the UE 1002 may access these modulation symbols from memory for wireless communication when the device is back online.

In one example, the data is compressed using a nonlinear operator prior to transmission in the uplink channel, and where decompression of the data is based on an estimation of a nonlinear model from the MDMRS. For instance, referring to FIGS. 5 and 10, NL TX module 508 of UE 1002 may compress the signal carrying uplink data 1008 using a NL operator prior to applying DPD on the compressed signal (at block 510) and passing the signal to the PA for transmission to base station 1004 via one or more TX antennas 514 (antennas 320) over channel 506. Following reception of uplink data 1008 over channel 506, NL RX module 522 of base station 1004 may estimate the NL model applied by the NL TX module 508 from the MDMRS 812, 1006. The NL model estimation may succeed regardless of whether the uplink data 1008 is received in CP-OFDM waveform 1010 or DFT-s-OFDM waveform 1016, since as described above with respect to FIG. 8, the PAPR distribution of the MDMRS 812, 1006 has been designed to match the PAPR distribution of the uplink data 1008 via parameters 1018. As a result, using this estimated NL model, NL RX module 522 may decompress the signal and compensate for any impacted EVM caused by the NL TX module 508.

Figure 12:
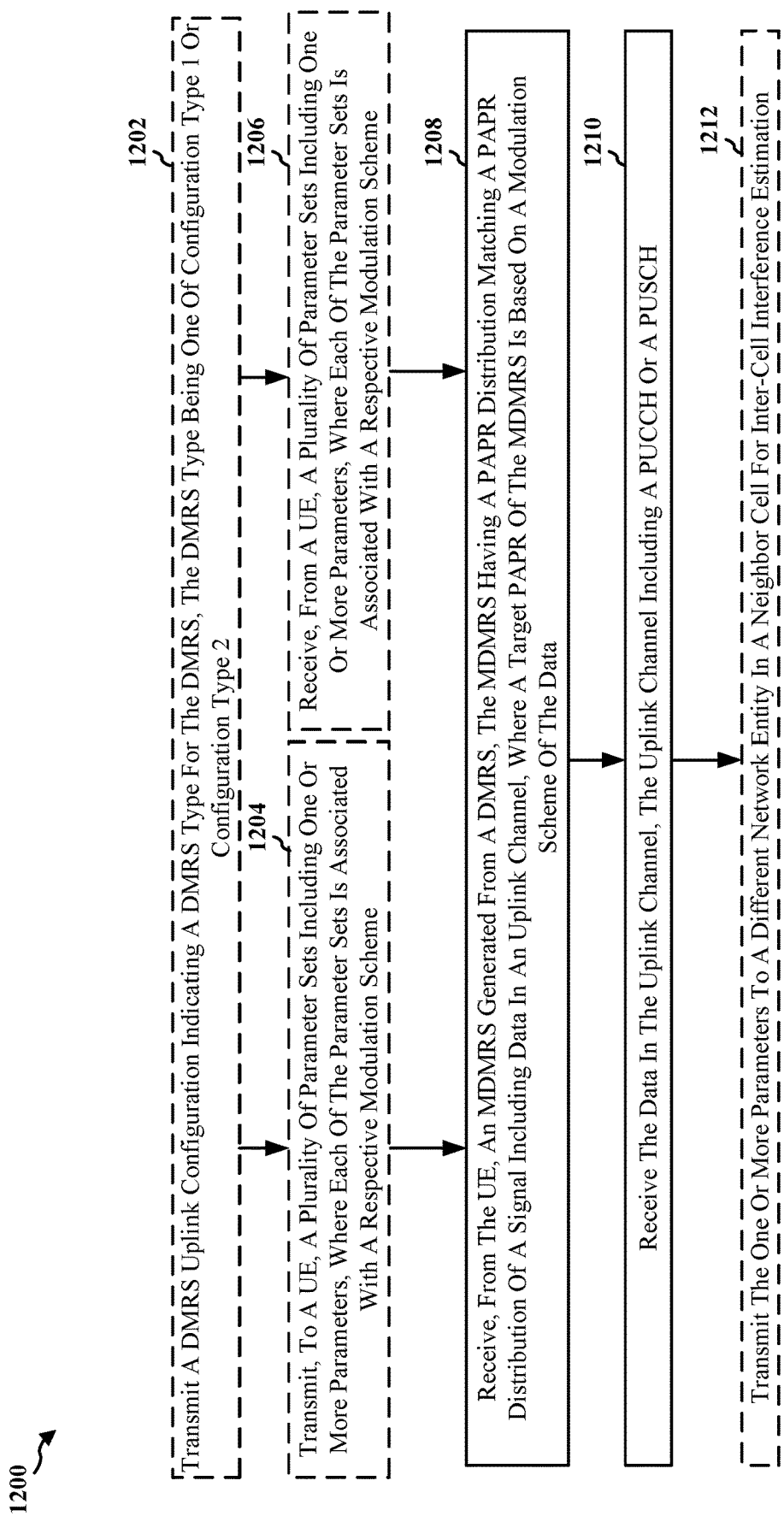
FIG. 12 is a flowchart of a method of wireless communication at a network entity.

FIG. 12 is a flowchart 1200 of a method of wireless communication. The method may be performed by a network entity (e.g., the base station 102/180, disaggregated base station 181, network device 310, base station 1004; the apparatus 1402). Optional aspects are illustrated in dashed lines. The method allows a network entity such as a base station to receive MDMRS using defined target parameters that result in matching PAPR distributions between DMRS and uplink data (e.g., in PUCCH or PUSCH).

At 1202, the network entity may transmit a DMRS uplink configuration indicating a DMRS type for a DMRS. For example, 1202 may be performed by DMRS uplink configuration component 1444. For instance, referring to FIG. 10, base station 1004 may transmit DMRS uplink configuration 1012 indicating DMRS type 1014 for DMRS 602, 803. The DMRS type may be one of configuration type 1 or configuration type 2.

At 1204, the network entity may transmit, to a UE, a plurality of parameter sets including one or more parameters, where each of the parameter sets is associated with a respective modulation scheme. For example, 1204 may be performed by parameter set component 1446. For instance, referring to FIG. 10, base station 1004 may determine the target properties for MDMRS and signal these properties or parameters 1018 to the UE 1002. In such case, UE 1002 may receive from base station 1004 multiple sets of parameters 1018 respectively for different modulation schemes (e.g., QPSK, 16QAM, 64QAM, 256QAM, etc.) via a MAC-CE or an RRC message.

Alternatively, at 1206, the network entity may receive, from the UE, a plurality of parameter sets including the one or more parameters, where each of the parameter sets is associated with a respective modulation scheme. For example, 1206 may be performed by parameter set component 1446. For instance, referring to FIG. 10, UE 1002 may determine the target properties for MDMRS and signal these properties or parameters 1018 to the base station 1004. In such case, base station 1004 may receive from UE 1002 multiple sets of parameters 1018 respectively for different modulation schemes (e.g., QPSK, 16QAM, 64QAM, 256QAM, etc.) via a MAC-CE or an RRC message.

As an alternative to 1204 and 1206, the one or more parameters may be preconfigured in one of a plurality of predefined parameter sets, and each of the predefined parameter sets may be associated with a respective modulation scheme and an orthogonal frequency division multiplexing (OFDM) waveform. For instance, referring to FIG. 10, UE 1002 and base station 1004 may respectively determine at blocks 1019 and 1021 the target properties for MDMRS from pre-configured or pre-defined sets of parameters 1018, which sets of parameters are dependent upon the OFDM waveform used for the uplink data 1008 (e.g., CP-OFDM or DFT-s-OFDM) and the modulation scheme applied to the uplink data 1008 (e.g., QPSK, 16QAM, 64QAM, or 256QAM).

In one example, the one or more parameters may include: a low pass filter coefficient (LPF) for filtering the DMRS, a number of iterations for clipping and filtering the DMRS, the target PAPR for the DMRS, an up-sampling factor for the DMRS, a down-sampling factor for the DMRS, a constraint threshold for constraining energy of the MDMRS, or a difference between an amplitude distribution value of the MDMRS in a cyclic prefix-orthogonal frequency division multiplexing (CP-OFDM) waveform and in a discrete Fourier transform-spread-orthogonal frequency division multiplexing (DFT-s-OFDM) waveform. For instance, referring to FIG. 10, the parameters 1018 may correspondingly include any of the following: one or more LPF coefficients (e.g., for filtering the up-sampled DMRS at block 806 of FIG. 8), a number of iterations (e.g., for clipping and filtering the up-sampled DMRS at blocks 804 and 806 of FIG. 8), a PAPR target (e.g., the target PAPR 808 which may obtained for the DMRS following the number of iterations of clipping and filtering at blocks 804 and 806 of FIG. 8), up-sampling and down-sampling factors (e.g., for up-sampling and down-sampling the time domain representation of the DMRS following performance of an IDFT at block 802 and prior to performance of a DFT at block 810 of FIG. 8, respectively), a constraint threshold (e.g., for constraining the energy of the MDMRS 812 at block 814 of FIG. 8), and a distribution delta (e.g., for matching the signal distributions between MDMRS signals in CP-OFDM and DFT-s-OFDM waveforms, which the NL operator may use to offset the target PAPR 808 prior to performing clipping and filtering at blocks 804 and 806 of FIG. 8).

At 1208, the network entity receives, from a UE, a MDMRS generated from the DMRS, the MDMRS having a PAPR distribution matching a PAPR distribution of a signal including data in an uplink channel, where a target PAPR of the MDMRS is based on a modulation scheme of the data. For example, 1208 may be performed by MDMRS reception component 1440. For instance, referring to FIG. 10, following generation of MDMRS 812, 1006 from DMRS 602, 803 at block 1005 (e.g., using the NL operator of FIG. 8), UE 1002 may transmit MDMRS 812, 1006 to base station 1004. For example, referring to FIG. 8, the NL operator of the UE 1002 may receive a target PAPR (e.g., 5 dB, 6 dB, 10 dB, or whatever PAPR value that matches the current PUSCH modulation scheme), and the NL operator may convert a QPSK-modulated DMRS (e.g., with a 3 dB PAPR) to an MDMRS whose PAPR matches this target PAPR. Base station 1004 may thus receive MDMRS 812, 1006 generated from DMRS 602, 803 from UE 1002.

In one example, the MDMRS is generated for channel estimation based on the one or more parameters associated with the modulation scheme of the data. For instance, referring to FIG. 10, base station 1004 may generate MDMRS 812, 1006 at block 1020 having a matching PAPR distribution with that of uplink data 1008 (PUSCH or PUCCH) based on various parameters 1018 or target properties (e.g., the parameters which the NL operator of FIG. 8 may apply to generate the MDMRS). The base station 1004 may select to apply these properties for a given modulation when performing channel estimation using MDMRS 1006. For example, at block 1020, the base station 1004 may input the DMRS 602, 803 using a given modulation scheme into the NL operator of FIG. 8 to generate an MDMRS 812, 1006 using the parameters 1018 associated with that modulation scheme, and the base station 1004 may subsequently perform channel estimation using the MDMRS 812, 1006.

In one example, the DMRS includes a quadrature phase shift keying (QPSK) modulation scheme, and the MDMRS is received in a cyclic prefix-orthogonal frequency division multiplexing (CP-OFDM) waveform. For instance, referring to FIG. 10, the DMRS 602, 803 from which the MDMRS 812, 1006 is generated at block 1005 may be QPSK-modulated, and the base station 1004 may receive the MDMRS 812, 1006 in CP-OFDM waveform 1010.

In one example, the data is received in a plurality of layers, and the MDMRS is generated respectively for each of the layers. For instance, referring to FIG. 10, when the UE 1002 performs layer mapping of modulated symbols, the UE may generate different MDMRS to be mapped to respective, individual layers. Thus, the NL operator of FIG. 8 may result in one generated MDMRS per layer. Accordingly, if uplink data 1008 is received by base station 1004 from UE 1002 in multiple layers, the UE 1002 may generate and transmit, and the base station 1004 may receive, MDMRS 812, 1006 for each of these multiple layers.

In one example, the MDMRS is generated based on the DMRS type at 1102 being the configuration type 1 or the configuration type 2. For instance, referring to FIG. 10, the UE 1002 may generate the MDMRS 812, 1006 at block 1005 (or the base station 1004 at block 1020) if the DMRS type 1014 is specifically configuration type 1 in one example. Alternatively, the UE 1002 or base station 1004 may generate the MDMRS 812, 1006 if the DMRS type 1014 is configuration type 2 in another example. Alternatively, the UE 1002 or base station 1004 may apply different parameters (e.g., different values of parameters 1018) for MDMRS generation depending on whether the DMRS type 1014 is configuration type 1 or configuration type 2.

In one example, the DMRS includes a same modulation scheme as the modulation scheme of the data, and the MDMRS is received in a discrete Fourier transform-spread-orthogonal frequency division multiplexing (DFT-s-OFDM) waveform. For instance, following generation of an MDMRS at block 1005 (e.g., such as described with respect to FIG. 8), the UE 1002 may transmit and the base station 1004 may receive MDMRS 812, 1006 in DFT-s-OFDM waveform 1016 using a same modulation scheme as that applied for the uplink data 1008 (e.g., QPSK, 16QAM, 64QAM, or 256QAM).

At 1210, the network entity receives the data in the uplink channel, the uplink channel including a PUCCH or a PUSCH. For example, 1210 may be performed by uplink data reception component 1442. For instance, referring to FIG. 10, base station 1004 may receive from UE 1002 uplink data 1008 including a PUCCH or PUSCH (e.g., PUSCH data 604).

At 1212, the network entity may transmit the one or more parameters to a different network entity in a neighbor cell for inter-cell interference estimation. For example, 1212 may be performed by neighbor cell component 1448. For instance, referring to FIG. 10, it is possible that when UE 1002 sends MDMRS 812, 1006 to base station 1004 in a transmission beam, a sidelobe transmission of this MDMRS from UE 1002 may cause interference at second base station 1022 in a neighbor cell. Therefore, base station 1004 may signal the parameters 1018 to second base station 1022 (e.g. via backhaul link of base station 1004) so that second base station 1022 may estimate and reduce the interference from UE 1002.

In one example, the MDMRS includes modulation symbols previously stored in the memory or generated in real-time. For instance, referring to FIG. 10, the UE 1002 may generate the MDMRS 812, 1006 at block 1005 (or the base station 1004 at block 1020) in real-time in its baseband unit using firmware or software configured to perform the functions of the NL operator of FIG. 8. In other examples, the UE 1002 or base station 1004 may pre-generate the MDMRS 1006 and store its modulation symbols in memory while the device is offline, and the UE 1002 or base station 1004 may access these modulation symbols from memory for wireless communication when the device is back online.

In one example, the data is compressed using a nonlinear operator prior to transmission in the uplink channel, and where decompression of the data is based on an estimation of a nonlinear model from the MDMRS. For instance, referring to FIGS. 5 and 10, NL TX module 508 of UE 1002 may compress the signal carrying uplink data 1008 using a NL operator prior to applying DPD on the compressed signal (at block 510) and passing the signal to the PA for transmission to base station 1004 via one or more TX antennas 514 (antennas 320) over channel 506. Following reception of uplink data 1008 over channel 506, NL RX module 522 of base station 1004 may estimate the NL model applied by the NL TX module 508 from the MDMRS 812, 1006. The NL model estimation may succeed regardless of whether the uplink data 1008 is received in CP-OFDM waveform 1010 or DFT-s-OFDM waveform 1016, since as described above with respect to FIG. 8, the PAPR distribution of the MDMRS 812, 1006 has been designed to match the PAPR distribution of the uplink data 1008 via parameters 1018. As a result, using this estimated NL model, NL RX module 522 may decompress the signal and compensate for any impacted EVM caused by the NL TX module 508.

Figure 13:
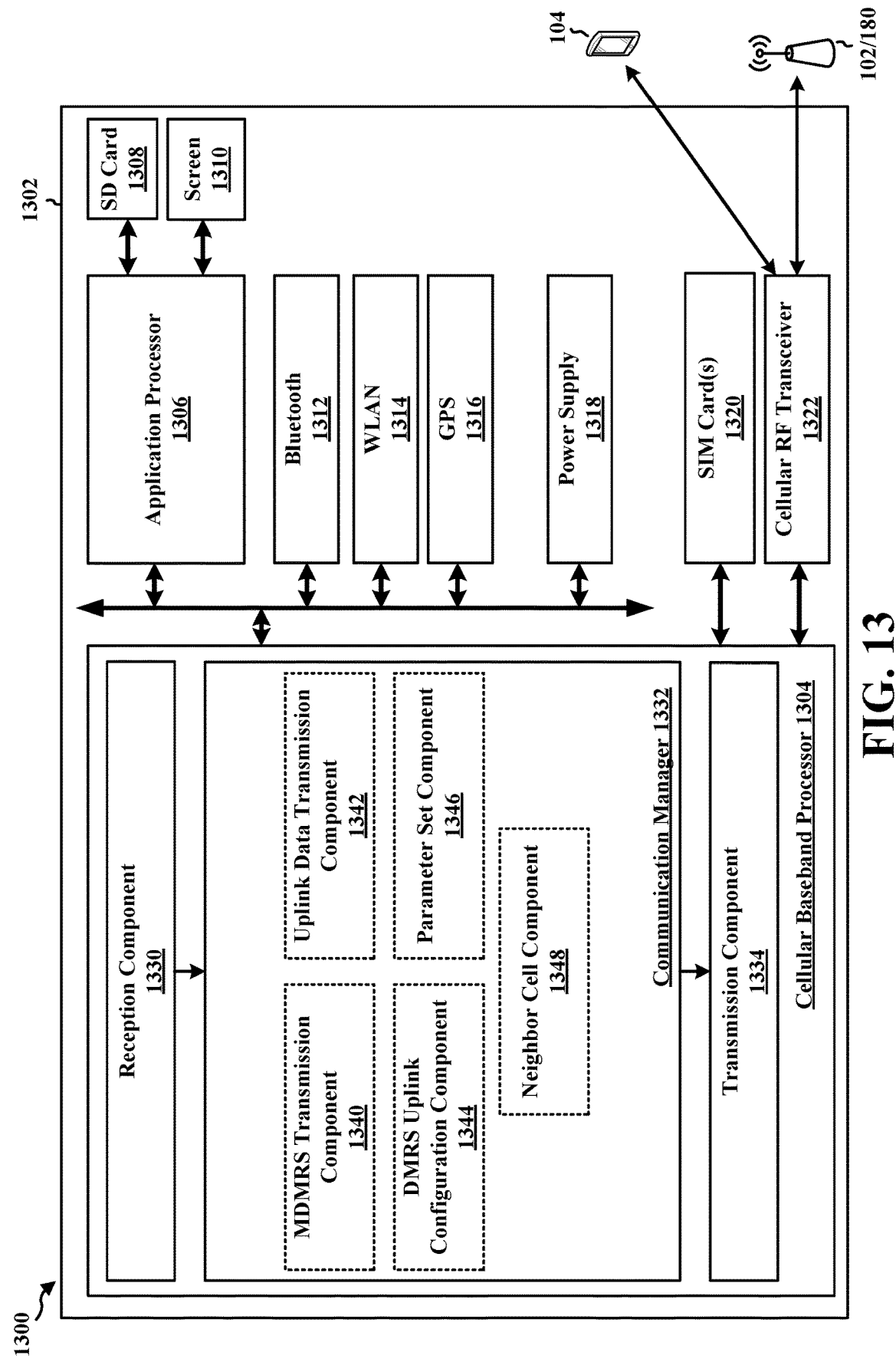
FIG. 13 is a diagram illustrating an example of a hardware implementation for an example apparatus.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/ memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the aforediscussed additional modules of the apparatus 1302.

The communication manager 1332 includes an MDMRS transmission component 1340 that is configured to transmit, to a network entity, a MDMRS generated from the DMRS, the MDMRS having a PAPR distribution matching a PAPR distribution of a signal including data in an uplink channel, where a target PAPR of the MDMRS is based on a modulation scheme of the data, e.g., as described in connection with 1108. The communication manager 1332 further includes an uplink data transmission component 1342 that is configured to transmit the data in the uplink channel, the uplink channel including a PUCCH or a PUSCH, e.g., as described in connection with 1110. The communication manager 1332 further includes a DMRS uplink configuration component 1344 that is configured to receive a DMRS uplink configuration indicating a DMRS type for a DMRS, e.g., as described in connection with 1102. The communication manager 1332 further includes a parameter set component 1346 that is configured to receive, from a network entity, a plurality of parameter sets including one or more parameters, where each of the parameter sets is associated with a respective modulation scheme, e.g., as described in connection with 1104. The parameter set component 1346 is further configured to transmit, to the network entity, a plurality of parameter sets including the one or more parameters, where each of the parameter sets is associated with a respective modulation scheme, e.g., as described in connection with 1106. The communication manager 1332 further includes a neighbor cell component 1348 that is configured to transmit the one or more parameters to a different network entity in a neighbor cell for inter-cell interference estimation, e.g., as described in connection with 1112.

The apparatus may include additional components that perform each of the blocks of the algorithm in the aforementioned flowcharts of FIGS. 10 and 11. As such, each block in the aforementioned flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for transmitting, to a network entity, a modified demodulation reference signal (MDMRS) generated from a demodulation reference signal (DMRS), the MDMRS having a peak to average power ratio (PAPR) distribution matching a PAPR distribution of a signal including data in an uplink channel, wherein a target PAPR of the MDMRS is based on a modulation scheme of the data; and wherein the means for transmitting is further configured to transmit the data in the uplink channel, the uplink channel including a physical uplink control channel (PUCCH) or a physical uplink shared channel (PUSCH).

In one configuration, the apparatus 1302, and in particular the cellular baseband processor 1304, includes means for receiving a DMRS uplink configuration indicating a DMRS type for the DMRS, the DMRS type being one of configuration type 1 or configuration type 2, wherein the MDMRS is generated based on the DMRS type being the configuration type 1 or the configuration type 2.

In one configuration, the apparatus 1302, and in particular the cellular baseband processor 1304, includes means for receiving, from the network entity, a plurality of parameter sets including the one or more parameters, wherein each of the parameter sets is associated with a respective modulation scheme.

In one configuration, the means for transmitting is further configured to transmit, to the network entity, a plurality of parameter sets including the one or more parameters, wherein each of the parameter sets is associated with a respective modulation scheme.

In one configuration, the means for transmitting is further configured to transmit the one or more parameters to a different network entity in a neighbor cell for inter-cell interference estimation.

The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
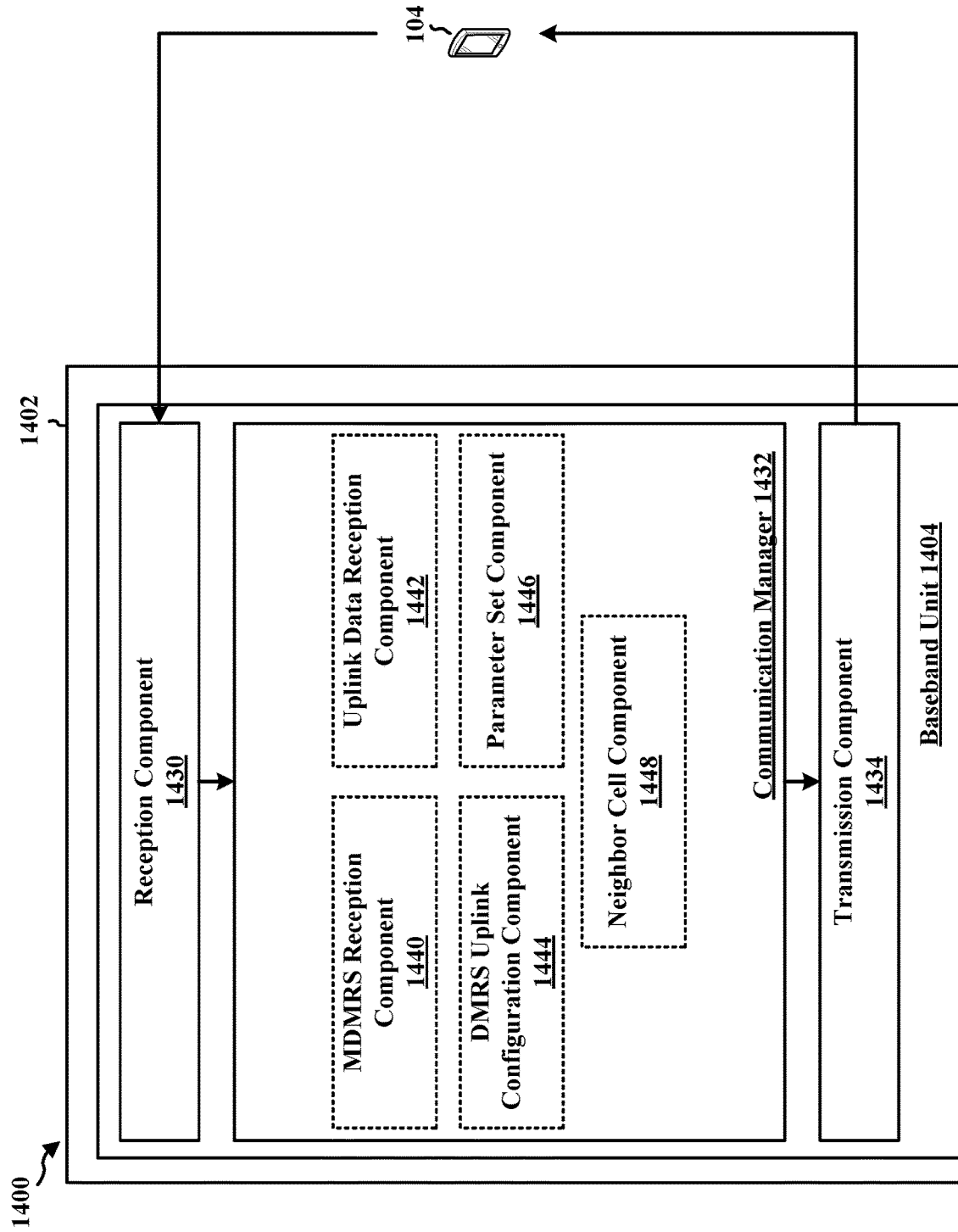
FIG. 14 is a diagram illustrating another example of a hardware implementation for another example apparatus.

FIG. 14 is a diagram 1400 illustrating an example of a hardware implementation for an apparatus 1402. The apparatus 1402 is a BS and includes a baseband unit 1404. The baseband unit 1404 may communicate through a cellular RF transceiver with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the network device 310 and may include the memory 376 and/or at least one of the TX processor 316, the RX processor 370, and the controller/processor 375.

The communication manager 1432 includes an MDMRS reception component 1440 that is configured to receive, from a UE, a MDMRS generated from the DMRS, the MDMRS having a PAPR distribution matching a PAPR distribution of a signal including data in an uplink channel, where a target PAPR of the MDMRS is based on a modulation scheme of the data, e.g., as described in connection with 1208. The communication manager 1432 further includes an uplink data reception component 1442 that is configured to receive the data in the uplink channel, the uplink channel including a PUCCH or a PUSCH, e.g., as described in connection with 1210. The communication manager 1432 further includes a DMRS uplink configuration component 1444 that is configured to transmit a DMRS uplink configuration indicating a DMRS type for a DMRS, e.g., as described in connection with 1202. The communication manager 1432 further includes a parameter set component 1446 that is configured to transmit, to a UE, a plurality of parameter sets including one or more parameters, where each of the parameter sets is associated with a respective modulation scheme, e.g., as described in connection with 1204. The parameter set component 1446 is further configured to receive, from a UE, a plurality of parameter sets including the one or more parameters, where each of the parameter sets is associated with a respective modulation scheme, e.g., as described in connection with 1206. The communication manager 1432 further includes a neighbor cell component 1448 that is configured to transmit the one or more parameters to a network entity in a neighbor cell for inter-cell interference estimation, e.g., as described in connection with 1212.

The apparatus may include additional components that perform each of the blocks of the algorithm in the aforementioned flowcharts of FIGS. 10 and 12. As such, each block in the aforementioned flowcharts of FIGS. 10 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for receiving, from a UE, a modified demodulation reference signal (MDMRS) generated from a demodulation reference signal (DMRS), the MDMRS having a peak to average power ratio (PAPR) distribution matching a PAPR distribution of a signal including data in an uplink channel, wherein a target PAPR of the MDMRS is based on a modulation scheme of the data; and wherein the means for receiving is further configured to receive the data in the uplink channel, the uplink channel including a physical uplink control channel (PUCCH) or a physical uplink shared channel (PUSCH).

In one configuration, the apparatus 1402, and in particular the baseband unit 1404, includes means for transmitting a DMRS uplink configuration indicating a DMRS type for the DMRS, the DMRS type being one of configuration type 1 or configuration type 2, wherein the MDMRS is generated based on the DMRS type being the configuration type 1 or the configuration type 2.

In one configuration, the apparatus 1402, and in particular the baseband unit 1404, includes means for transmitting, to the UE, a plurality of parameter sets including the one or more parameters, wherein each of the parameter sets is associated with a respective modulation scheme.

In one configuration, the means for receiving is further configured to receive, from the UE, a plurality of parameter sets including the one or more parameters, wherein each of the parameter sets is associated with a respective modulation scheme.

In one configuration, the apparatus 1402, and in particular the baseband unit 1404, includes means for transmitting the one or more parameters to a different network entity in a neighbor cell for inter-cell interference estimation.

The aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Accordingly, aspects of the present disclosure provide for generation and transmission of MDMRS which allow matching of NL model impact or properties between DMRS and data in DFT-s-OFDM waveforms as well as CP-OFDM waveforms. By applying desired PAPR target parameters for a given modulation order of an MDMRS, the transmitter of an uplink communication (e.g., a UE) and the receiver of an uplink communication (e.g., a base station) may determine that the PAPR distributions between data and DMRS match. The desired PAPR target parameters which the UE and base station may apply to generate MDMRS may be either selected by the base station and signaled to the UE, selected by the UE and signaled to the base station, or determined by the UE and base station from pre-defined sets of parameters. As a result of this ability of MDMRS to match the NL impact of DMRS and PUSCH/PUCCH, an NL TX module of the UE may apply an NL operator to reduce the PAPR of PUSCH/PUCCH data, while an NL RX module of the base station may estimate from the MDMRS the NL model applied by the NL operator of the UE. Thus, the base station may compensate for any EVM that may occur as a result of the PAPR reduction by the UE, and communication performance may thereby be improved.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Clause 1. An apparatus for wireless communication, comprising: a processor; memory coupled with the processor; and instructions stored in the memory and operable, when executed by the processor, to cause the apparatus to: transmit, to a network entity, a modified demodulation reference signal (MDMRS) generated from a demodulation reference signal (DMRS), the MDMRS having a peak to average power ratio (PAPR) distribution matching a PAPR distribution of a signal including data in an uplink channel, wherein a target PAPR of the MDMRS is based on a modulation scheme of the data; and transmit the data in the uplink channel, the uplink channel including a physical uplink control channel (PUCCH) or a physical uplink shared channel (PUSCH).

Clause 2. The apparatus of clause 1, wherein the data is compressed using a nonlinear operator prior to transmission in the uplink channel, and wherein decompression of the data is based on an estimation of a nonlinear model from the MDMRS.

Clause 3. The apparatus of clause 1 or clause 2, wherein the DMRS includes a quadrature phase shift keying (QPSK) modulation scheme, and the MDMRS is transmitted in a cyclic prefix-orthogonal frequency division multiplexing (CP-OFDM) waveform.

Clause 4. The apparatus of clause 3, wherein the data is transmitted in a plurality of layers, and the MDMRS is generated respectively for each of the layers.

Clause 5. The apparatus of clause 3 or clause 4, wherein the instructions, when executed by the processor, further cause the apparatus to: receive a DMRS uplink configuration indicating a DMRS type for the DMRS, the DMRS type being one of configuration type 1 or configuration type 2, wherein the MDMRS is generated based on the DMRS type being the configuration type 1 or the configuration type 2.

Clause 6. The apparatus of clause 1 or clause 2, wherein the DMRS includes a same modulation scheme as the modulation scheme of the data, and the MDMRS is transmitted in a discrete Fourier transform-spread-orthogonal frequency division multiplexing (DFT-s-OFDM) waveform.

Clause 7. The apparatus of any of clauses 1 to 6, wherein the MDMRS is generated prior to transmission based on one or more parameters associated with the modulation scheme of the data.

Clause 8. The apparatus of clause 7, wherein the MDMRS includes modulation symbols previously stored in the memory or generated in real-time.

Clause 9. The apparatus of clause 7 or clause 8, wherein the one or more parameters include: a low pass filter coefficient (LPF) for filtering the DMRS, a number of iterations for clipping and filtering the DMRS, the target PAPR for the DMRS, an up-sampling factor for the DMRS, a down-sampling factor for the DMRS, a constraint threshold for constraining energy of the MDMRS, or a difference between an amplitude distribution value of the MDMRS in a cyclic prefix-orthogonal frequency division multiplexing (CP-OFDM) waveform and in a discrete Fourier transform-spread-orthogonal frequency division multiplexing (DFT-s-OFDM) waveform.

Clause 10. The apparatus of any of clauses 7 to 9, wherein the instructions, when executed by the processor, further cause the apparatus to: receive, from the network entity, a plurality of parameter sets including the one or more parameters, wherein each of the parameter sets is associated with a respective modulation scheme.

Clause 11. The apparatus of any of clauses 7 to 9, wherein the instructions, when executed by the processor, further cause the apparatus to: transmit, to the network entity, a plurality of parameter sets including the one or more parameters, wherein each of the parameter sets is associated with a respective modulation scheme.

Clause 12. The apparatus of any of clauses 7 to 9, wherein the one or more parameters are preconfigured in one of a plurality of predefined parameter sets, and each of the predefined parameter sets is associated with a respective modulation scheme and an orthogonal frequency division multiplexing (OFDM) waveform.

Clause 13. The apparatus of any of clauses 7 to 12, wherein the instructions, when executed by the processor, further cause the apparatus to: transmit the one or more parameters to a different network entity in a neighbor cell for inter-cell interference estimation.

Clause 14. An apparatus for wireless communication, comprising: a processor; memory coupled with the processor; and instructions stored in the memory and operable, when executed by the processor, to cause the apparatus to: receive, from a user equipment (UE), a modified demodulation reference signal (MDMRS) generated from a demodulation reference signal (DMRS), the MDMRS having a peak to average power ratio (PAPR) distribution matching a PAPR distribution of a signal including data in an uplink channel, wherein a target PAPR of the MDMRS is based on a modulation scheme of the data; and receive the data in the uplink channel, the uplink channel including a physical uplink control channel (PUCCH) or a physical uplink shared channel (PUSCH).

Clause 15. The apparatus of clause 14, wherein the data is compressed using a nonlinear operator prior to transmission in the uplink channel, and wherein decompression of the data is based on an estimation of a nonlinear model from the MDMRS.

Clause 16. The apparatus of clause 14 or clause 15, wherein the DMRS includes a quadrature phase shift keying (QPSK) modulation scheme, and the MDMRS is received in a cyclic prefix-orthogonal frequency division multiplexing (CP-OFDM) waveform.

Clause 17. The apparatus of clause 16, wherein the data is received in a plurality of layers, and the MDMRS is generated respectively for each of the layers.

Clause 18. The apparatus of clause 16 or clause 17, wherein the instructions, when executed by the processor, further cause the apparatus to: transmit a DMRS uplink configuration indicating a DMRS type for the DMRS, the DMRS type being one of configuration type 1 or configuration type 2, wherein the MDMRS is generated based on the DMRS type being the configuration type 1 or the configuration type 2.

Clause 19. The apparatus of clause 14 or clause 15, wherein the DMRS includes a same modulation scheme as the modulation scheme of the data, and the MDMRS is received in a discrete Fourier transform-spread-orthogonal frequency division multiplexing (DFT-s-OFDM) waveform.

Clause 20. The apparatus of any of clauses 14 to 19, wherein the MDMRS is generated for channel estimation based on one or more parameters associated with the modulation scheme of the data.

Clause 21. The apparatus of clause 20, wherein the MDMRS includes modulation symbols previously stored in the memory or generated in real-time.

Clause 22. The apparatus of clause 20 or clause 21, wherein the one or more parameters include: a low pass filter coefficient (LPF) for filtering the DMRS, a number of iterations for clipping and filtering the DMRS, the target PAPR for the DMRS, an up-sampling factor for the DMRS, a down-sampling factor for the DMRS, a constraint threshold for constraining energy of the MDMRS, or a difference between an amplitude distribution value of the MDMRS in a cyclic prefix-orthogonal frequency division multiplexing (CP-OFDM) waveform and in a discrete Fourier transform-spread-orthogonal frequency division multiplexing (DFT-s-OFDM) waveform.

Clause 23. The apparatus of any of clauses 20 to 22, wherein the instructions, when executed by the processor, further cause the apparatus to: transmit, to the UE, a plurality of parameter sets including the one or more parameters, wherein each of the parameter sets is associated with a respective modulation scheme.

Clause 24. The apparatus of any of clauses 20 to 22, wherein the instructions, when executed by the processor, further cause the apparatus to: receive, from the UE, a plurality of parameter sets including the one or more parameters, wherein each of the parameter sets is associated with a respective modulation scheme.

Clause 25. The apparatus of any of clauses 20 to 22, wherein the one or more parameters are preconfigured in one of a plurality of predefined parameter sets, and each of the predefined parameter sets is associated with a respective modulation scheme and an orthogonal frequency division multiplexing (OFDM) waveform.

Clause 26. The apparatus of any of clauses 20 to 25, wherein the instructions, when executed by the processor, further cause the apparatus to: transmit the one or more parameters to a network entity in a neighbor cell for inter-cell interference estimation.

Clause 27. A method of wireless communication at a user equipment (UE), comprising: transmitting, to a network entity, a modified demodulation reference signal (MDMRS) generated from a demodulation reference signal (DMRS), the MDMRS having a peak to average power ratio (PAPR) distribution matching a PAPR distribution of a signal including data in an uplink channel, wherein a target PAPR of the MDMRS is based on a modulation scheme of the data; and transmitting the data in the uplink channel, the uplink channel including a physical uplink control channel (PUCCH) or a physical uplink shared channel (PUSCH).

Clause 28. The method of clause 27, wherein the data is compressed using a nonlinear operator prior to transmission in the uplink channel, and wherein decompression of the data is based on an estimation of a nonlinear model from the MDMRS.

Clause 29. A method of wireless communication at a network entity, comprising: receiving, from a user equipment (UE), a modified demodulation reference signal (MDMRS) generated from a demodulation reference signal (DMRS), the MDMRS having a peak to average power ratio (PAPR) distribution matching a PAPR distribution of a signal including data in an uplink channel, wherein a target PAPR of the MDMRS is based on a modulation scheme of the data; and receiving the data in the uplink channel, the uplink channel including a physical uplink control channel (PUCCH) or a physical uplink shared channel (PUSCH).

Clause 30. The method of clause 29, wherein the data is compressed using a nonlinear operator prior to transmission in the uplink channel, and wherein decompression of the data is based on an estimation of a nonlinear model from the MDMRS.

What is claimed is:

1. An apparatus for wireless communication, comprising:
a processor;
memory coupled with the processor; and
instructions stored in the memory and operable, when executed by the processor, to cause the apparatus to:
transmit, to a network entity, a modified demodulation reference signal (MDMRS) generated from a demodulation reference signal (DMRS), the MDMRS having a peak to average power ratio (PAPR) distribution matching a PAPR distribution of a signal including data in an uplink channel, wherein a target PAPR of the MDMRS is based on a modulation scheme of the data; and
transmit the data in the uplink channel, the uplink channel including a physical uplink control channel (PUCCH) or a physical uplink shared channel (PUSCH).

2. The apparatus of claim 1, wherein the data is compressed using a nonlinear operator prior to transmission in the uplink channel, and wherein decompression of the data is based on an estimation of a nonlinear model from the MDMRS.

3. The apparatus of claim 1, wherein the DMRS includes a quadrature phase shift keying (QPSK) modulation scheme, and the MDMRS is transmitted in a cyclic prefix-orthogonal frequency division multiplexing (CP-OFDM) waveform.

4. The apparatus of claim 3, wherein the data is transmitted in a plurality of layers, and the MDMRS is generated respectively for each of the layers.

5. The apparatus of claim 3, wherein the instructions, when executed by the processor, further cause the apparatus to:
receive a DMRS uplink configuration indicating a DMRS type for the DMRS, the DMRS type being one of configuration type 1 or configuration type 2, wherein the MDMRS is generated based on the DMRS type being the configuration type 1 or the configuration type 2.

6. The apparatus of claim 1, wherein the DMRS includes a same modulation scheme as the modulation scheme of the data, and the MDMRS is transmitted in a discrete Fourier transform-spread-orthogonal frequency division multiplexing (DFT-s-OFDM) waveform.

7. The apparatus of claim 1, wherein the MDMRS is generated prior to transmission based on one or more parameters associated with the modulation scheme of the data.

8. The apparatus of claim 7, wherein the MDMRS includes modulation symbols previously stored in the memory or generated in real-time.

9. The apparatus of claim 7, wherein the one or more parameters include:
a low pass filter coefficient (LPF) for filtering the DMRS,
a number of iterations for clipping and filtering the DMRS,
the target PAPR for the DMRS,
an up-sampling factor for the DMRS,
a down-sampling factor for the DMRS,
a constraint threshold for constraining energy of the MDMRS, or
a difference between an amplitude distribution value of the MDMRS in a cyclic prefix-orthogonal frequency division multiplexing (CP-OFDM) waveform and in a discrete Fourier transform-spread-orthogonal frequency division multiplexing (DFT-s-OFDM) waveform.

10. The apparatus of claim 7, wherein the instructions, when executed by the processor, further cause the apparatus to:
receive, from the network entity, a plurality of parameter sets including the one or more parameters, wherein each of the parameter sets is associated with a respective modulation scheme.

11. The apparatus of claim 7, wherein the instructions, when executed by the processor, further cause the apparatus to:
transmit, to the network entity, a plurality of parameter sets including the one or more parameters, wherein each of the parameter sets is associated with a respective modulation scheme.

12. The apparatus of claim 7, wherein the one or more parameters are preconfigured in one of a plurality of predefined parameter sets, and each of the predefined parameter sets is associated with a respective modulation scheme and an orthogonal frequency division multiplexing (OFDM) waveform.

13. The apparatus of claim 7, wherein the instructions, when executed by the processor, further cause the apparatus to:
transmit the one or more parameters to a different network entity in a neighbor cell for inter-cell interference estimation.

14. An apparatus for wireless communication, comprising:
a processor;
memory coupled with the processor; and
instructions stored in the memory and operable, when executed by the processor, to cause the apparatus to:
receive, from a user equipment (UE), a modified demodulation reference signal (MDMRS) generated from a demodulation reference signal (DMRS), the MDMRS having a peak to average power ratio (PAPR) distribution matching a PAPR distribution of a signal including data in an uplink channel, wherein a target PAPR of the MDMRS is based on a modulation scheme of the data; and
receive the data in the uplink channel, the uplink channel including a physical uplink control channel (PUCCH) or a physical uplink shared channel (PUSCH).

15. The apparatus of claim 14, wherein the data is compressed using a nonlinear operator prior to transmission in the uplink channel, and wherein decompression of the data is based on an estimation of a nonlinear model from the MDMRS.

16. The apparatus of claim 14, wherein the DMRS includes a quadrature phase shift keying (QPSK) modulation scheme, and the MDMRS is received in a cyclic prefix-orthogonal frequency division multiplexing (CP-OFDM) waveform.

17. The apparatus of claim 16, wherein the data is received in a plurality of layers, and the MDMRS is generated respectively for each of the layers.

18. The apparatus of claim 16, wherein the instructions, when executed by the processor, further cause the apparatus to:
transmit a DMRS uplink configuration indicating a DMRS type for the DMRS, the DMRS type being one of configuration type 1 or configuration type 2, wherein the MDMRS is generated based on the DMRS type being the configuration type 1 or the configuration type 2.

19. The apparatus of claim 14, wherein the DMRS includes a same modulation scheme as the modulation scheme of the data, and the MDMRS is received in a discrete Fourier transform-spread-orthogonal frequency division multiplexing (DFT-s-OFDM) waveform.

20. The apparatus of claim 14, wherein the MDMRS is generated for channel estimation based on one or more parameters associated with the modulation scheme of the data.

21. The apparatus of claim 20, wherein the MDMRS includes modulation symbols previously stored in the memory or generated in real-time.

22. The apparatus of claim 20, wherein the one or more parameters include:
a low pass filter coefficient (LPF) for filtering the DMRS,
a number of iterations for clipping and filtering the DMRS,
the target PAPR for the DMRS,
an up-sampling factor for the DMRS,
a down-sampling factor for the DMRS,
a constraint threshold for constraining energy of the MDMRS, or
a difference between an amplitude distribution value of the MDMRS in a cyclic prefix-orthogonal frequency division multiplexing (CP-OFDM) waveform and in a discrete Fourier transform-spread-orthogonal frequency division multiplexing (DFT-s-OFDM) waveform.

23. The apparatus of claim 20, wherein the instructions, when executed by the processor, further cause the apparatus to:
transmit, to the UE, a plurality of parameter sets including the one or more parameters, wherein each of the parameter sets is associated with a respective modulation scheme.

24. The apparatus of claim 20, wherein the instructions, when executed by the processor, further cause the apparatus to:

receive, from the UE, a plurality of parameter sets including the one or more parameters, wherein each of the parameter sets is associated with a respective modulation scheme.

25. The apparatus of claim 20, wherein the one or more parameters are preconfigured in one of a plurality of predefined parameter sets, and each of the predefined parameter sets is associated with a respective modulation scheme and an orthogonal frequency division multiplexing (OFDM) waveform.

26. The apparatus of claim 20, wherein the instructions, when executed by the processor, further cause the apparatus to:
transmit the one or more parameters to a network entity in a neighbor cell for inter-cell interference estimation.

27. A method of wireless communication at a user equipment (UE), comprising:
transmitting, to a network entity, a modified demodulation reference signal (MDMRS) generated from a demodulation reference signal (DMRS), the MDMRS having a peak to average power ratio (PAPR) distribution matching a PAPR distribution of a signal including data in an uplink channel, wherein a target PAPR of the MDMRS is based on a modulation scheme of the data; and
transmitting the data in the uplink channel, the uplink channel including a physical uplink control channel (PUCCH) or a physical uplink shared channel (PUSCH).

28. The method of claim 27, wherein the data is compressed using a nonlinear operator prior to transmission in the uplink channel, and wherein decompression of the data is based on an estimation of a nonlinear model from the MDMRS.

29. A method of wireless communication at a network entity, comprising:
receiving, from a user equipment (UE), a modified demodulation reference signal (MDMRS) generated from a demodulation reference signal (DMRS), the MDMRS having a peak to average power ratio (PAPR) distribution matching a PAPR distribution of a signal including data in an uplink channel, wherein a target PAPR of the MDMRS is based on a modulation scheme of the data; and
receiving the data in the uplink channel, the uplink channel including a physical uplink control channel (PUCCH) or a physical uplink shared channel (PUSCH).

30. The method of claim 29, wherein the data is compressed using a nonlinear operator prior to transmission in the uplink channel, and wherein decompression of the data is based on an estimation of a nonlinear model from the MDMRS.

* * * * *